United States Patent
Morita

(10) Patent No.: US 7,679,657 B2
(45) Date of Patent: Mar. 16, 2010

(54) IMAGE SENSING APPARATUS HAVING ELECTRONIC ZOOM FUNCTION, AND CONTROL METHOD THEREFOR

(75) Inventor: Masahiko Morita, Akiruno (JP)

(73) Assignee: Canon Kabushiki Kaisha, Tokyo (JP)

( * ) Notice: Subject to any disclaimer, the term of this patent is extended or adjusted under 35 U.S.C. 154(b) by 457 days.

(21) Appl. No.: 11/754,448

(22) Filed: May 29, 2007

(65) Prior Publication Data

US 2007/0296837 A1  Dec. 27, 2007

(30) Foreign Application Priority Data

Jun. 7, 2006  (JP) .............................. 2006-159139

(51) Int. Cl.
  *H04N 5/262*  (2006.01)
  *H04N 5/235*  (2006.01)
(52) U.S. Cl. .............................. 348/240.2; 348/240.99; 348/230.1
(58) Field of Classification Search ............ 348/240.99, 348/240.2, 240.3, 230.1, 347, 211.9, 208.6; 396/379
See application file for complete search history.

(56) References Cited

U.S. PATENT DOCUMENTS

| 5,867,217 | A  | * | 2/1999  | Okino et al. | ........... | 348/240.99 |
| 5,990,947 | A  |   | 11/1999 | Okino |  |  |
| 6,542,201 | B1 | * | 4/2003  | Song et al. | ................... | 348/561 |
| 6,654,053 | B1 | * | 11/2003 | Hwang | ..................... | 348/240.1 |
| 6,947,074 | B2 | * | 9/2005  | Koseki et al. | ............ | 348/240.1 |
| 6,947,082 | B2 | * | 9/2005  | Gomi | ...................... | 348/240.2 |

FOREIGN PATENT DOCUMENTS

| JP | 05-191703   | A | 7/1993  |
| JP | 08-009221   |   | 1/1996  |
| JP | 09-033793   |   | 2/1997  |
| JP | 2002-072074 | A | 3/2002  |
| JP | 2002-305678 | A | 10/2002 |
| JP | 2002-314868 |   | 10/2002 |
| JP | 2002-330329 | A | 11/2002 |
| JP | 2003-125270 |   | 4/2003  |

OTHER PUBLICATIONS

The above references were cited in a Apr. 18, 2008 Japanese Office Action issued in the counterpart Japanese Patent Application 2006-159139, which is enclosed.

* cited by examiner

*Primary Examiner*—Lin Ye
*Assistant Examiner*—Mekonnen Dagnew
(74) *Attorney, Agent, or Firm*—Cowan, Liebowitz & Latman, P.C.

(57) ABSTRACT

In an image sensing apparatus having an image sensing element that senses an object and outputs image data and an electronic zoom function, either a first processing mode or a second processing mode is set and an angle of view is designated. In the first processing mode, the image sensing element is driven by switching reading regions and reading methods of image data from the image sensing element based on the designated angle of view and the image data is read, processed, and the angle of view determined by the switched reading region is changed to the designated angle of view. In the second processing mode, the reading region and the reading method of the image data are fixed and the image data output from the image sensing element is processed, and the angle of view determined by the fixed reading region changed to the designated angle of view.

3 Claims, 27 Drawing Sheets

F I G. 2A
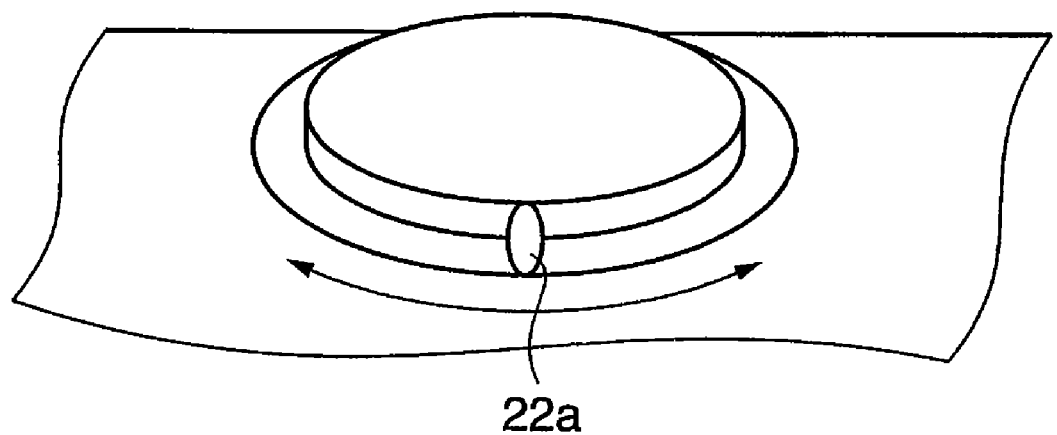
22a

FIG. 5

| | |
|---|---|
| | |
| | |
| | |
| 774 → 774 | DRIVE D |
| 1176 → 588 | DRIVE C |
| 1536 → 512 | DRIVE B |
| 1944 → 486 | DRIVE A |

F I G. 10A
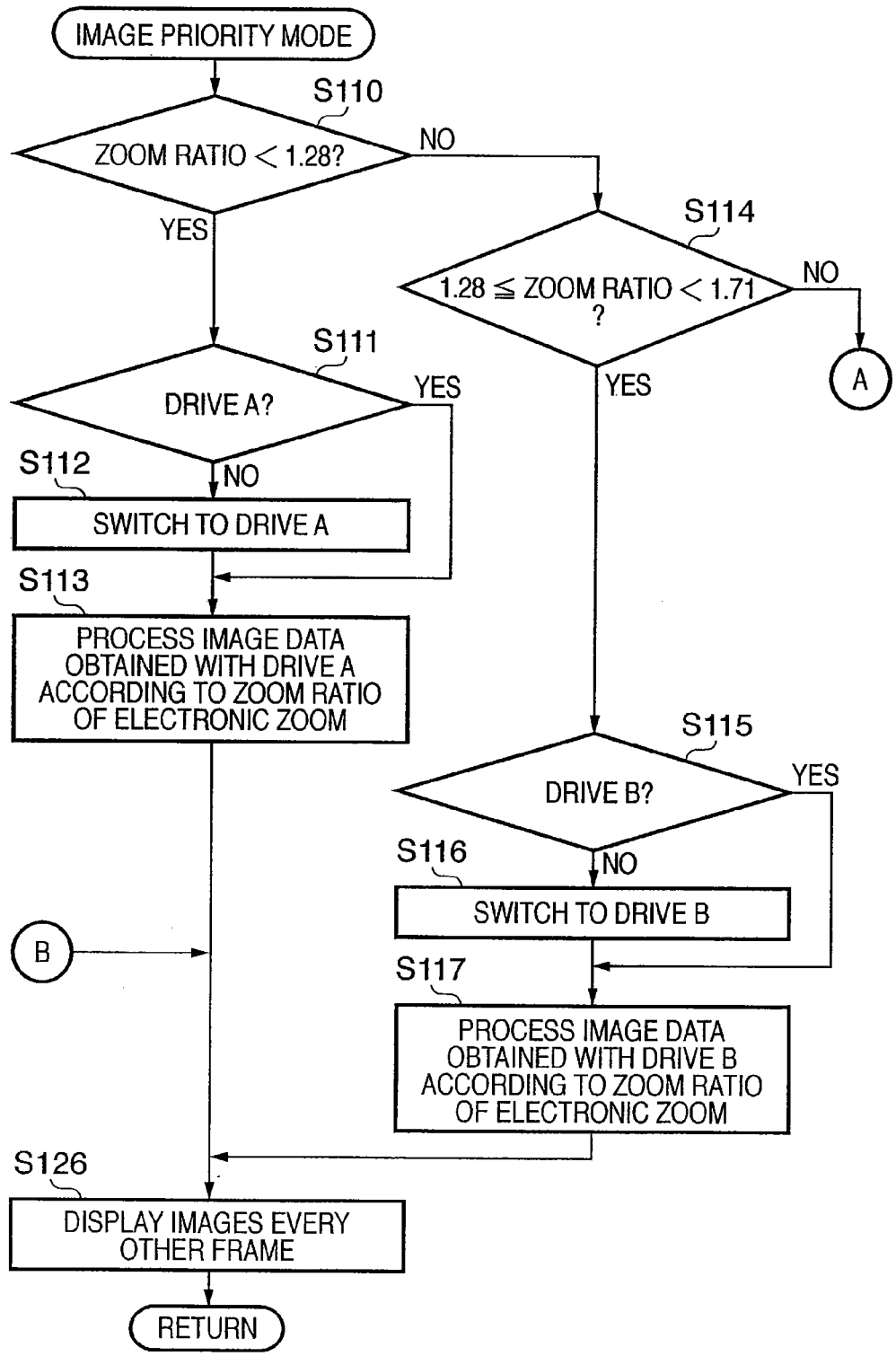

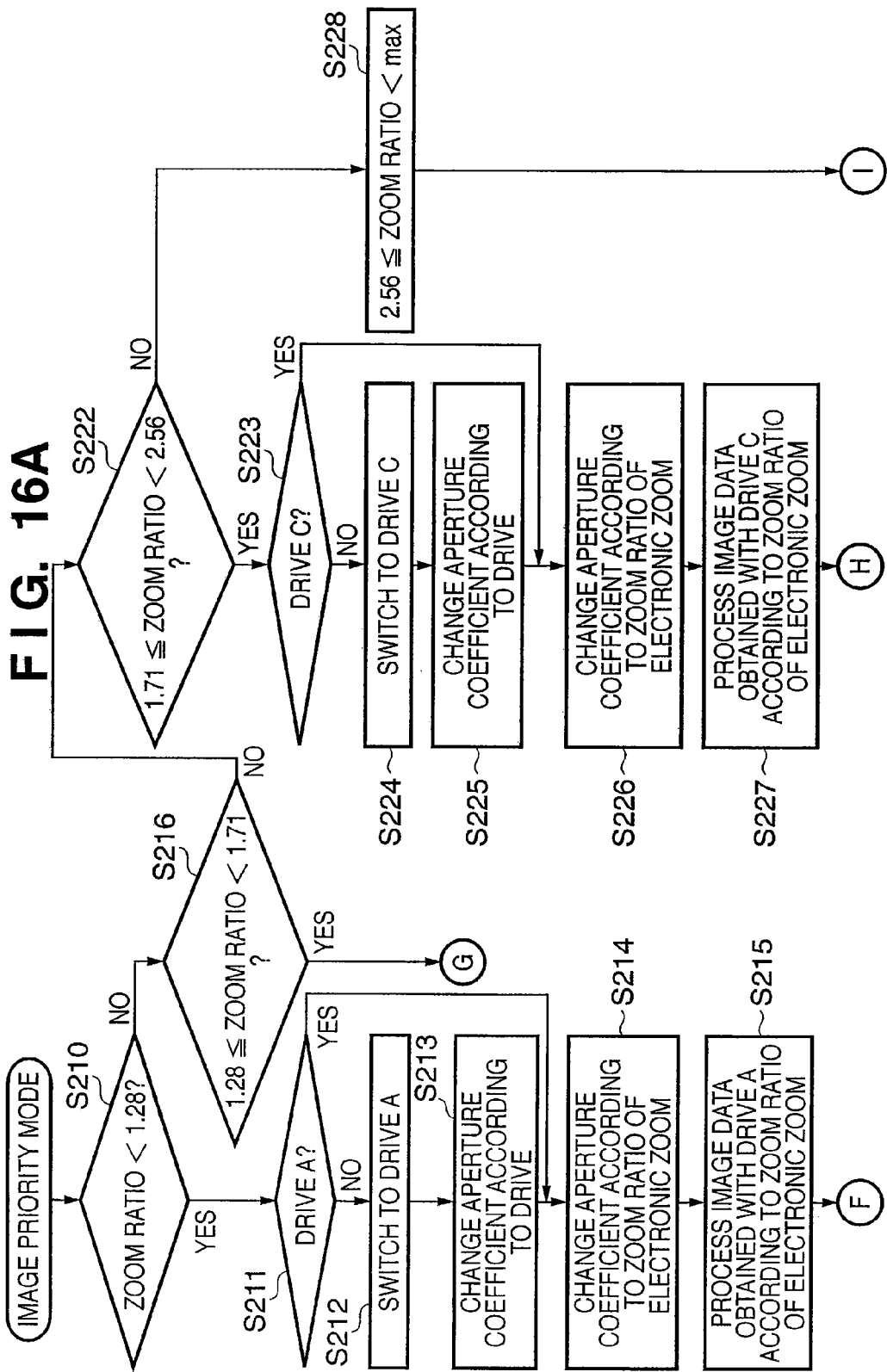

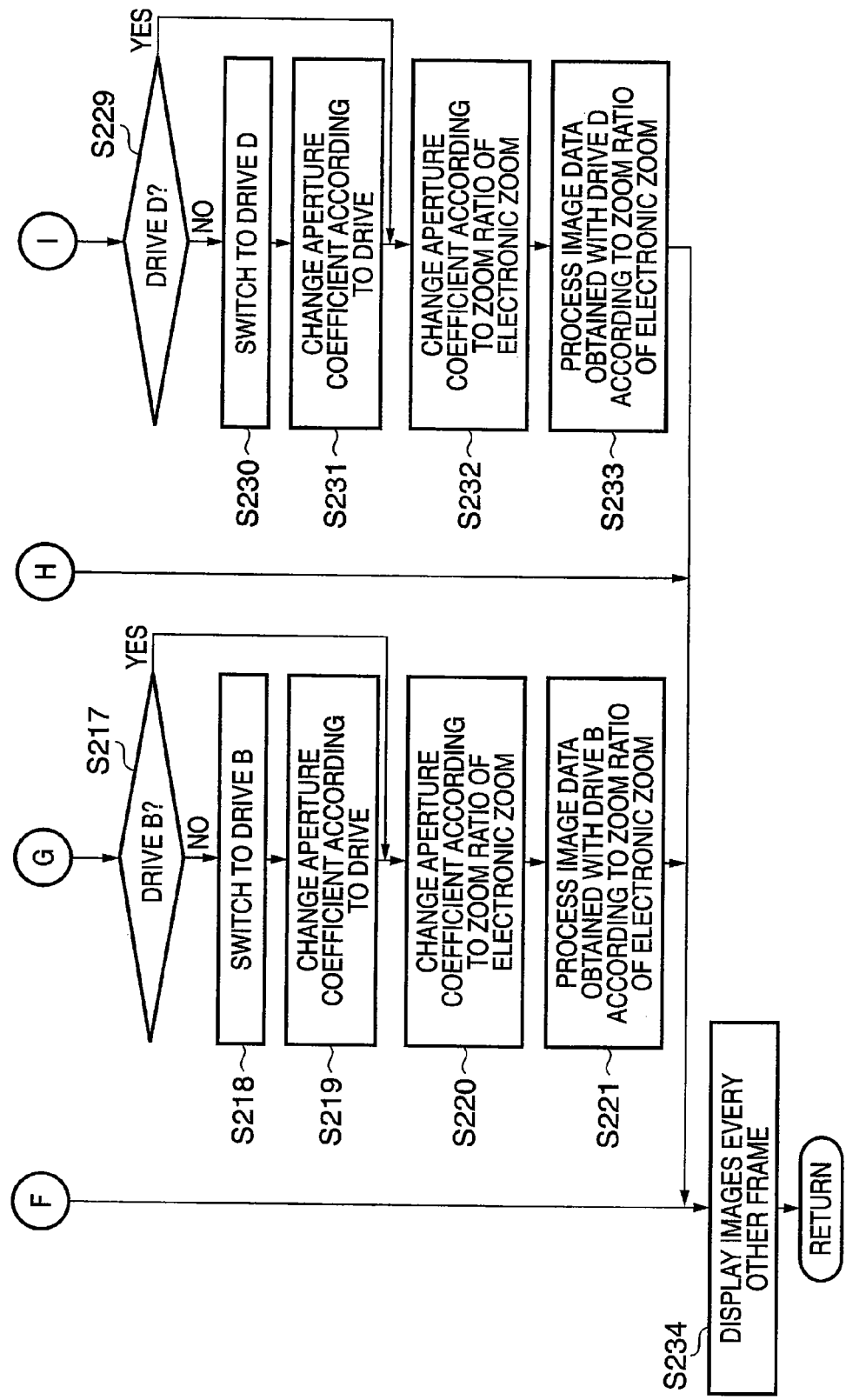

F I G. 17B
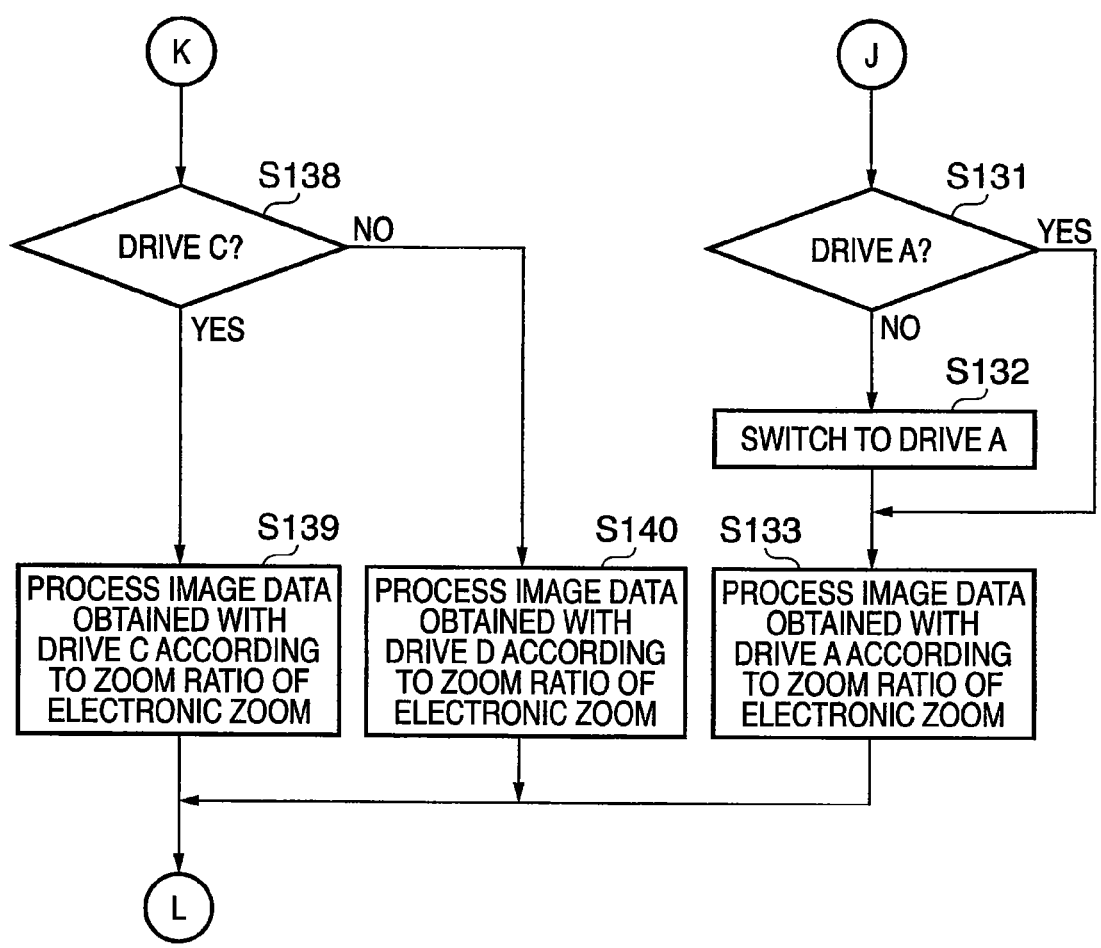

IMAGE SENSING APPARATUS HAVING ELECTRONIC ZOOM FUNCTION, AND CONTROL METHOD THEREFOR

BACKGROUND OF THE INVENTION

1. Field of the Invention

The present invention relates to an image sensing apparatus that senses still images and moving images and a control method therefore, and more particularly, to an image sensing apparatus having an electronic zoom function, and a control method therefor.

2. Description of the Related Art

Image sensing apparatuses, notably digital cameras and digital video cameras, that form an optical image on an image sensing element, perform various signal processes on the image data obtained by photoelectric conversion, and output a visual image of the object field on a liquid crystal monitor, and at the same time record on a recording medium, have been proposed. The recorded image data is either a still image, which uses substantially all of the data of pixels located within the effective area of the image sensing element, or a moving image, which uses only data obtained by thinning and/or averaging the data of pixels located within the effective area of the image sensing element such that the centers of gravity of the pixels become uniform.

In addition, among image sensing apparatuses, as means for setting the angle of view of the subject to be photographed, there are those that have an optical zoom achieved by a zoom lens and those that have an electronic zoom achieved by processing the image data obtained from the image sensing element. Electronic zoom methods are of two general types. One is a method involving manipulating the drive method used to scan the image sensing element, as described, for example, in Japanese Patent Laid-Open (JPA) 2002-314868. The other is a method involving enlarging the image obtained from the image sensing element, as described, for example, in Japanese Patent Laid-Open (JPA) H08-009221 and Japanese Patent Laid-Open (JPA) H09-033793. Moreover, as described for example in Japanese Patent Laid-Open (JPA) 2002-314868 and Japanese Patent Laid-Open (JPA) H09-033793, a proposal to achieve a wide range of an angle of view setting by combining optical zoom and electronic zoom has also been made.

Further, Japanese Patent Laid-Open (JPA) 2002-314868 also discloses a higher-resolution electronic zoom achieved by changing the reading region using an image sensing element that employs an X-Y address type scanning method.

Moreover, Japanese Patent Laid-Open (JPA) 2003-125270 proposes carrying out electronic zoom by fixing the reading area of the image sensing element and performing enlarging processing on the image data obtained from the image sensing element until a prescribed zoom ratio is reached, and changing the reading area of the image sensing element depending on the magnification if the prescribed magnification is exceeded so as to reduce deterioration in picture quality.

The number of pixels in the image sensing elements used in these image sensing apparatuses has increased every year, and recently some apparatuses have image sensing elements with more than 10 million pixels. As pixel density has increased the resolutions of still images has improved but the time required for image readout has lengthened.

At the same time, with an electronic viewfinder (EVF), which refreshes the image at predetermined periods of time and outputs the refreshed image to the liquid crystal monitor, and during moving image recording, an image of a number of pixels that is determined by the number of pixels in the liquid crystal monitor or by the specifications of moving image recording is acquired at predetermined periods of time. As the number of pixels in the image sensing element increases, the need arises to thin and/or to average more pixels in order to obtain the image of the number of pixels for the EVF and/or for moving picture recording, lengthening the time needed for readout.

Further, with electronic zoom accomplished by manipulating the image sensing element drive method as in Japanese Patent Laid-Open (JPA) 2002-314868, there is a possibility that the rate at which the image from the image sensing element is refreshed declines in proportion to the electronic zoom magnification ratio. In such a case, in order to maintain the rate at which the image from the image sensing element is refreshed, the drive frequency must be increased in proportion to the zoom ratio of the electronic zoom.

Further, in order to obtain more pixel information from the image sensing element so as to improve the image quality, together with increasing the drive frequency it is also necessary to increase the signal processing frequency so as to process at high speed the image data output from the image sensing element. As a result, overall power consumption also increases.

In addition, an image sensing apparatus using an image sensing element employing the X-Y address type scanning method of Japanese Patent Laid-Open (JPA) 2002-314868 has the following problem: Specifically, combination of using electronic zoom that changes the image sensing element read drive method at each predetermined zoom ratio and electronic zoom that enlarges the image data obtained from the image sensing element in accordance with designated zoom ratio makes it impossible to display an image smoothly when the image sensing element read drive method is changed.

SUMMARY OF THE INVENTION

The present invention has been made in consideration of the above situation, and has as its object to be able to carry out smoother display or recording of images when executing an EVF function and recording moving images while changing the angle of view with an electronic zoom.

According to the present invention, the foregoing object is obtained by providing an image sensing apparatus having an electronic zoom function, the image sensing apparatus comprising: an image sensing element configured to sense an object and outputs image data; a mode setting unit configured to set either a first processing mode or a second processing mode; a zoom designation unit configured to designate an angle of view; a first zoom changing unit configured to change the angle of view by driving the image sensing element by switching a reading region and a reading method of image data from the image sensing element based on an angle of view designated by the zoom designation unit; and a second zoom changing unit configured to process image data output from the image sensing element and change an angle of view determined by the control of the first zoom changing unit to the angle of view designated by the zoom designation unit, wherein the image sensing apparatus performs zooming using the first zoom changing unit and the second zoom changing unit in the first processing mode, and performs zooming using the second zoom changing unit without switching image data reading region and reading method in the second processing mode.

According to the present invention, the foregoing object is also obtained by providing a control method for an image sensing apparatus having an image sensing element configured to sense an object and outputs image data and an electronic zoom function, the control method comprising: a mode setting step of setting either a first processing mode or a second processing mode; a zoom designation step of designating an angle of view; a first zoom changing step of driving the image sensing element by switching a reading region and a reading method of image data from the image sensing element based on an angle of view designated in the zoom designation step and reading the image data, processing such read image data, and changing an angle of view determined by the switched reading region to an angle of view designated in the zoom designation step when the first processing mode is set in the mode setting step; and a second zoom changing step of, without changing the image data reading region and reading method, processing image data output from the image sensing element and changing the angle of view determined by the current reading region to the angle of view designated in the zoom designation step when the second processing mode is set in the mode setting step.

Further features of the present invention will become apparent from the following description of exemplary embodiments (with reference to the attached drawings).

BRIEF DESCRIPTION OF THE DRAWINGS

FIGS. 2A and 2B are diagrams showing the external appearance of a T/W switch and a circuit structure for detecting operation of the T/W switch according to an embodiment of the present invention;

FIG. 5 is a schematic diagram of reading regions of an image sensing element according to an embodiment of the present invention;

FIG. 16 is a flow chart illustrating the electronic zoom process in the image quality priority mode according to the second embodiment of the present invention.

DESCRIPTION OF THE EMBODIMENTS

Preferred embodiments of the present invention will be described in detail in accordance with the accompanying drawings.

First Embodiment

Image Sensing System Configuration

Figure 1:
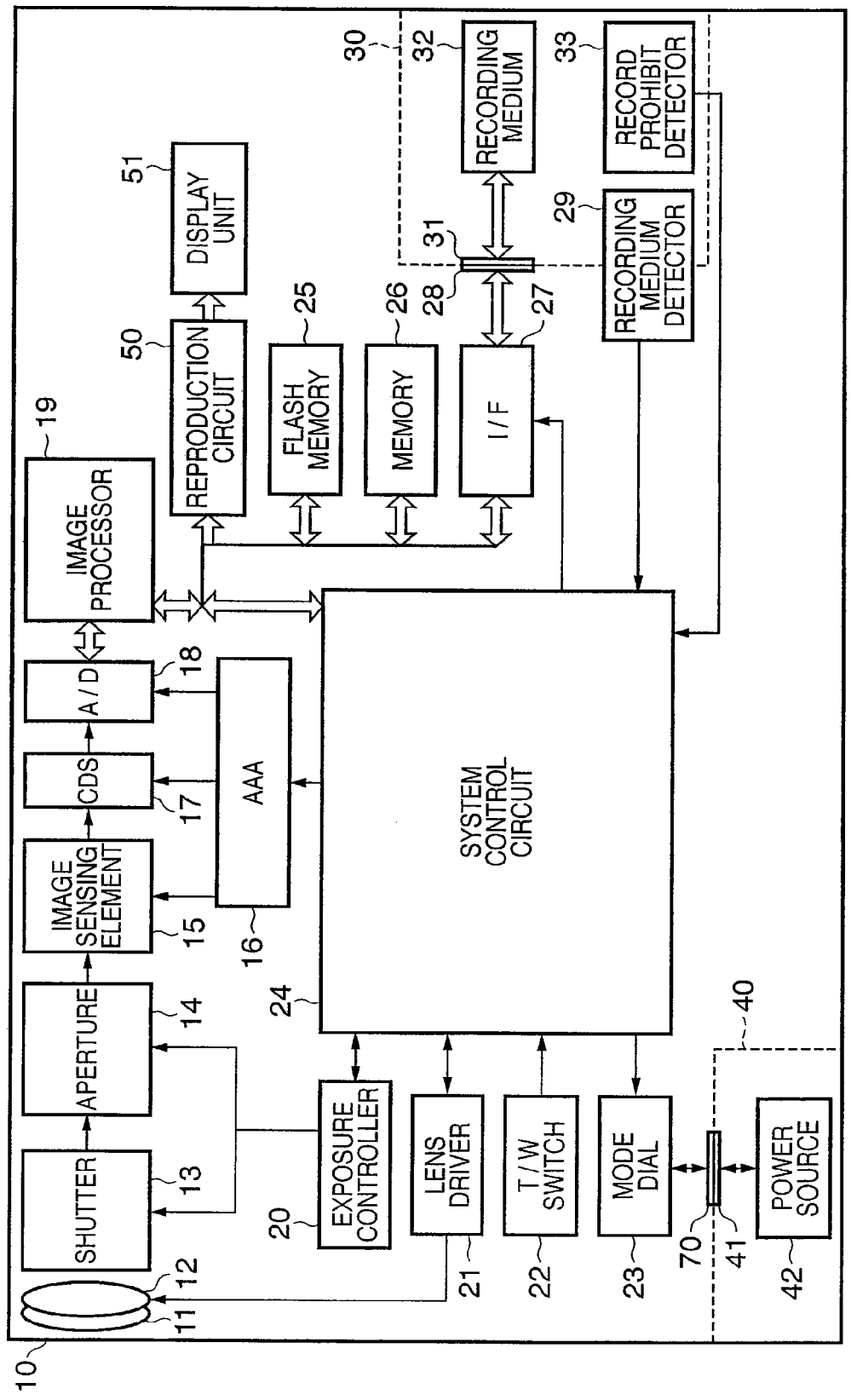
FIG. 1 is a block diagram showing the configuration of an image sensing system according to an embodiment of the present invention.

FIG. 1 is a block diagram showing the configuration of an image sensing system according to an embodiment of the present invention. In FIG. 1, reference numeral 10 denotes an image sensing apparatus. In the image sensing apparatus 10, reference numeral 11 denotes a zoom lens, 12 denotes a focus lens, 13 denotes a mechanical shutter that shuts out light to a later stage, and 14 denotes an aperture that adjusts the amount of light reaching the later stage. Reference numeral 15 denotes an image sensing element and 16 denotes a timing pulse generator that generates a timing pulse needed for image sensing element 15 driving and sampling that is driven by a system control circuit 24. Reference numeral 17 denotes a CDS element that performs correlated double sampling (CDS) on the output of the image sensing element 15 based on the timing pulse generated by the timing pulse generator 16, and 18 denotes an A/D converter that quantizes the CDS output based on the timing pulse generated by the timing pulse generator 16.

Reference numeral 19 denotes an image processor that receives the output from the A/D converter 18 which becomes the image sensing output and performs various processes thereon, and contains a signal processing circuit, a reduction circuit, a raster block conversion circuit, and a compression circuit. The signal processing circuit performs color carrier removal, aperture correction, gamma correction and so forth on the A/D converter 18 output data and generates a luminance signal, and at the same time carries out color interpolation, matrix conversion, gamma processing, gain control and the like and generates a color difference signal. It then outputs YUV-format image data to a memory 26.

The reduction circuit receives the output of the signal processing circuit and performs cropping, thinning and linear interpolation on the input pixel data, and reduces the pixel data both horizontally and vertically. The raster-block conversion circuit receives the reduced data and converts the raster scan image data changed by the reduction circuit into block scan image data. This series of image processes is implemented using the memory 26 as a buffer memory. The image data converted into block scan image data is then compressed block by block by the compression circuit using JPEG compression.

Reference numeral 20 denotes an exposure controller that controls the mechanical shutter 13 and the aperture 14, and 21 denotes a lens driver that moves the zoom lens 11 and the focus lens 12 along the optical axis to focus the object field image on the image sensing element 15. In addition, reference numeral 22 denotes a T/W switch for setting the angle of view and 23 denotes a mode dial for setting the operation of the image sensing apparatus 10. It should be noted that, in the changing of the angle of view carried out in response to the operation of the T/W switch 22, there is the optical zoom accomplished by moving the zoom lens and the electronic zoom accomplished by changing the drive mode of the image sensing element 15 and processing the image output obtained from the image sensing element 15. A detailed description of the relation between an instruction to change the angle of view from the T/W switch 22 and the zoom method is given later.

The controls described above are carried out by the system control circuit 24, which is composed of a CPU and its interface circuit, a DMAC (Direct Memory Access Controller), a bus arbiter, and so forth. A program that the CPU executes is stored in a flash memory 25.

Reference numeral 40 denotes a battery BOX that holds a battery 42 in the image sensing apparatus 10, and contains a battery 42 as a power source and a connector 41. By connecting the connector 41 to a connector 70 of the image sensing apparatus 10, the image sensing apparatus 10 and the battery 42 are connected.

Reference numeral 32 denotes a recording medium, 28 and 31 denote connectors that connect the image sensing apparatus 10 and the recording medium 32, 33 denotes a record prohibit detector that detects the position of a recording medium write prohibit switch, and 29 denotes a recording medium detector that detects the insertion and removal of the recording medium 32. Reference numeral 27 is an I/F for writing to and reading from the recording medium 32 through the connectors 28, 31.

Reference numeral 50 denotes a reproduction circuit that converts the image data generated by the image processor 19 and stored in the memory 26 into an image for display and transmits it to the monitor, and 51 denotes a display unit such as an LCD or the like. The reproduction circuit 50 separates the YUV-format image data into a luminance component signal Y and a color difference component C, performs D/A conversion, and puts the analog Y signal through an LPF (low-pass filter). In addition, the reproduction circuit 50 puts the analog C signal, which has undergone D/A conversion, through a BPF (bandpass filter) and extracts only the frequency component within a predetermined frequency range from the color difference component C. The signal components thus generated are converted into a Y signal and an RGB signal based on a sub-carrier frequency and output to the display unit 51. It should be noted that the electronic viewfinder (EVF) function is implemented by continuously processing and displaying the image data obtained from the image sensing element 15.

T/W Switch 22 Configuration

Figure 2B:
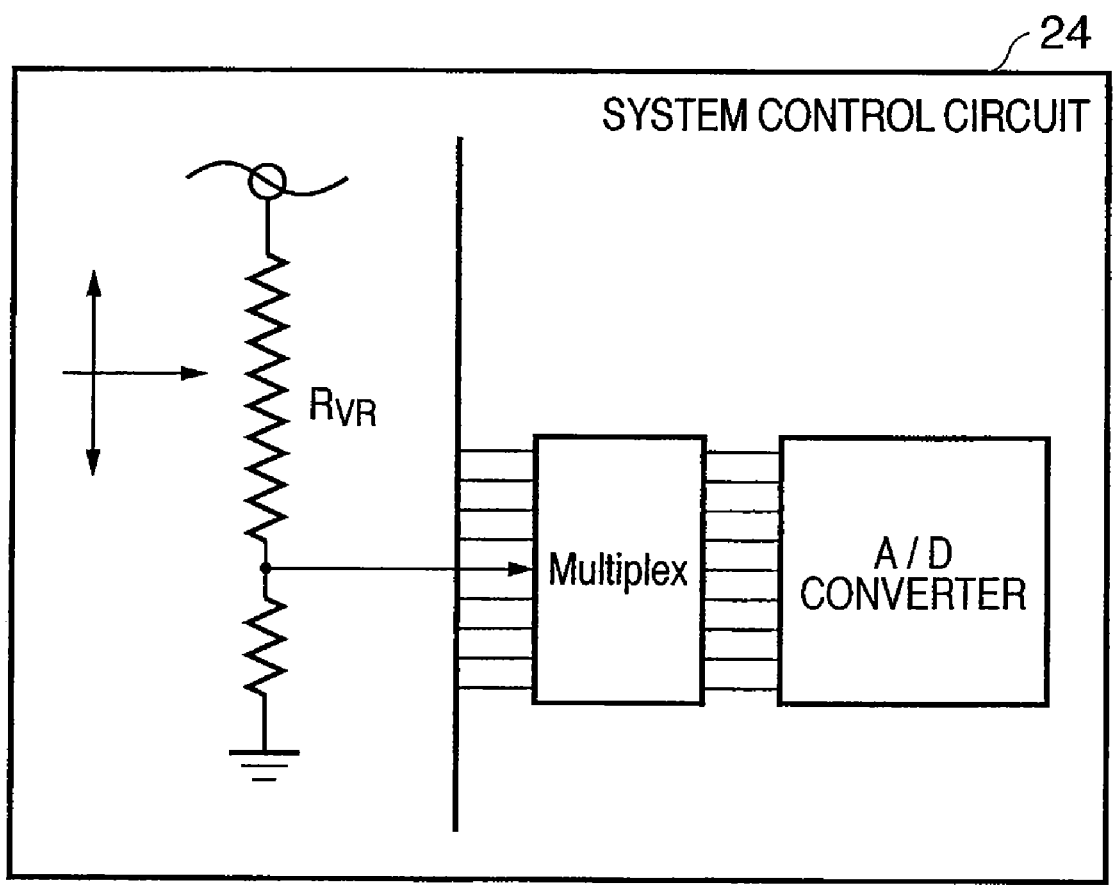

FIGS. 2A and 2B show an example of the T/W switch 22, in which FIG. 2A shows an example of the external appearance of the T/W switch 22 and FIG. 2B shows the configuration of a circuit for detecting the operation of the T/W switch 22. By rotating the central projection 22a shown in FIG. 2A in the direction of the arrows, the user can instruct zooming to either the telephoto direction or the wide-angle direction. A T/W switch 22 operating ring is connected to a variable resistor Rvr built into the T/W switch 22 shown in FIG. 2B, such that a voltage value that is uniquely determined in response to the operation of the switch is converted into a digital signal by the A/D converter of the system control circuit 24. Moreover, the CPU in the system control circuit 24 and a program can control the zooming speed in accordance with the operation of the T/W switch 22. For example, with a 10-bit converter centered at 511 LSB, a range between ±255 could be a low-speed region and a range beyond ±256 could be a high-speed region. It should be noted that the speed division is not limited to just two divisions.

Image Sensing Element Configuration

Figure 3:
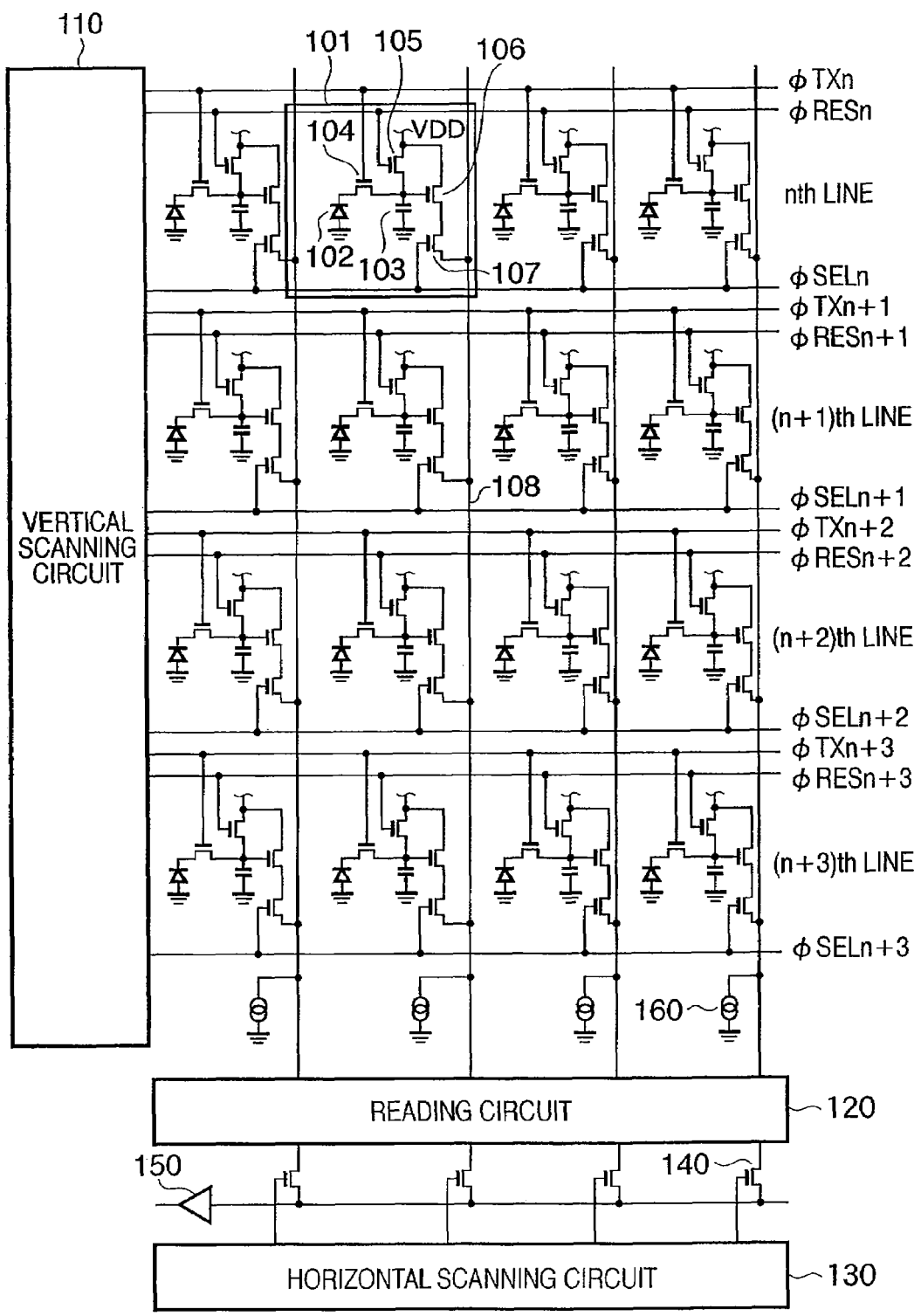
FIG. 3 is a diagram showing a circuit structure of a portion of an image sensing element according to an embodiment of the present invention.

FIG. 3 shows the circuit structure of a portion of the image sensing element 15 according to the present embodiment. In FIG. 3, only a 4×4 array of pixels is shown in order to facilitate a description of the invention. However, in reality, from several million to several tens of millions of pixels are arrayed in the image sensing element.

Reference numeral 101 denotes a unit pixel. In an actual image sensing element, the unit pixels 101 are deployed two-dimensionally at a predetermined aspect ratio. In addition, each unit pixel is covered by either an R, G, or B color filter. In this case, the color filters are arrayed in a Bayer pattern arrangement.

In the unit pixels 101, reference numeral 102 denotes a photodiode (hereinafter PD) that converts incoming light into an electrical charge and 103 denotes a floating diffusion part (hereinafter FD) that acts as a storage area that temporarily stores the electrical charge generated by the PD 102. Reference numeral 104 denotes a transfer switch that transfers the electrical charge generated by the PD 102 to the FD 103 with a transfer pulse $\phi$ TX and 105 denotes a reset switch that erases the electrical charge stored in the FD 103 with a reset pulse $\phi$ RES. Reference numeral 106 denotes an amplification MOS amp that functions as a source follower and 107 denotes a selection switch that selects a pixel with a selection pulse $\phi$ SEL.

At each line, the gate electrodes of the transfer switch 104, the reset switch 105 and the selection switch 107 are each connected to signal lines that supply pulses $\phi$TX, $\phi$RES and $\phi$SEL, respectively, and are selectively scanned by a vertical scanning circuit 110. Reference numeral 160 denotes a constant current source that becomes the load for the amplification MOS amp 106. At each column, the unit pixels 101 and the constant current source 160 are connected to a signal output line 108 by a reading circuit 120. Reference numeral 140 denotes an output selection switch that selects a signal to be output from the reading circuit 120, and is driven by a horizontal scanning circuit 130. Reference numeral 150 denotes an output amp that outputs signals output from the reading circuit 120 to outside the image sensing element 15.

It should be noted that although the example shown in FIG. 3 shows a 1-channel read configuration, a configuration using multiple channels to increase read speed is also possible. For example, the image sensing element 15 may be given a 2-channel read circuit and a horizontal scanning circuit, with the odd-numbered lines and the even-numbered lines read separately and rearranged by the signal processor 19.

When photographing a still image with the image sensing element 15 having the configuration described above, the electrical charges of substantially all the pixels in the effective area of the image sensing element 15 are read and an image is generated. When photographing a still image, typically a collective reset and reading is employed, in which the electrical charges of the PD102 and the FD103 of all the unit pixels 101 are reset all at once and read in units of lines, and typically a mechanical light-shielding member is used as the shutter. In this driving to read the electrical charges of substantially all the pixels, the rate at which image data in units of frames is obtained from the image sensing element is much lower than, for example, the rate at which the EVF display is refreshed.

By contrast, in driving for the EVF or for moving image photography, it is preferable that the rate at which image data in units of frames is obtained from the image sensing element be close to the rate at which the display is refreshed. Moreover, since the resolution required for display in EVF and moving image photography is extremely low compared to that for still images, the number of pixels read from the image sensing element 15 is thinned and/or averaged so as to be close to the number of pixels required to generate an image for display. However, so long as the pixels are averaged or thinned, it is necessary to take steps to ensure that the center of gravity between the colors of the Bayer array in the finished image for display is not drastically skewed.

In addition, in driving during EVF or moving image photography of the image sensing element 15 having the configuration shown in FIG. 3, it is necessary to read the frame image or the field image from the image sensing element 15 continuously, and therefore the following scanning is employed: First, in units of lines, the electrical charges stored in the PD 102 and the FD 103 are sequentially reset, and after a predetermined period of time has elapsed the electrical charges stored in the pixels are sequentially read in units of lines. After reading, the PD 102 and the FD 103 are once again reset in units of sequentially read lines. With this type of control, the electrical charges are continuously read while keeping the storage time in units of lines constant. This type of reading method is variously called rolling electronic shutter, rolling shutter or focal plane electronic shutter. In this specification, it is hereinafter referred to as rolling shutter.

Switching Between Optical Zoom and Electronic Zoom During Zoom Operation

Next, a description is given of the operation of the image sensing apparatus 10 during zoom operation according to a first embodiment of the present invention.

When the image sensing apparatus is activated by switching ON a main switch, not shown, the system control circuit 24 controls the lens driver 21 based on a predetermined sequence so as to drive the zoom lens 11 and the focus lens 12 to standby positions. At these standby positions, the zoom lens 11 is driven to the wide-angle end (the position with the widest angle of view). Further, the system control circuit 24 drives the exposure controller 20 so as to drive the shutter 13 and the aperture 14 to standby positions as well. In addition, the system control circuit 24 drives the image sensing element 15 with a drive A described later, inputs the output from the image sensing element 15 to the image processor 19 through the A/D converter 18, and generates display-image YUV data by the processing route described above and stores the data in the memory 26. Although a detailed description is given later, it should be noted that, in drive A, the output image of the image sensing element 15 is not partially cropped and an image for display with a 100 percent angle of view is generated.

Figure 4:
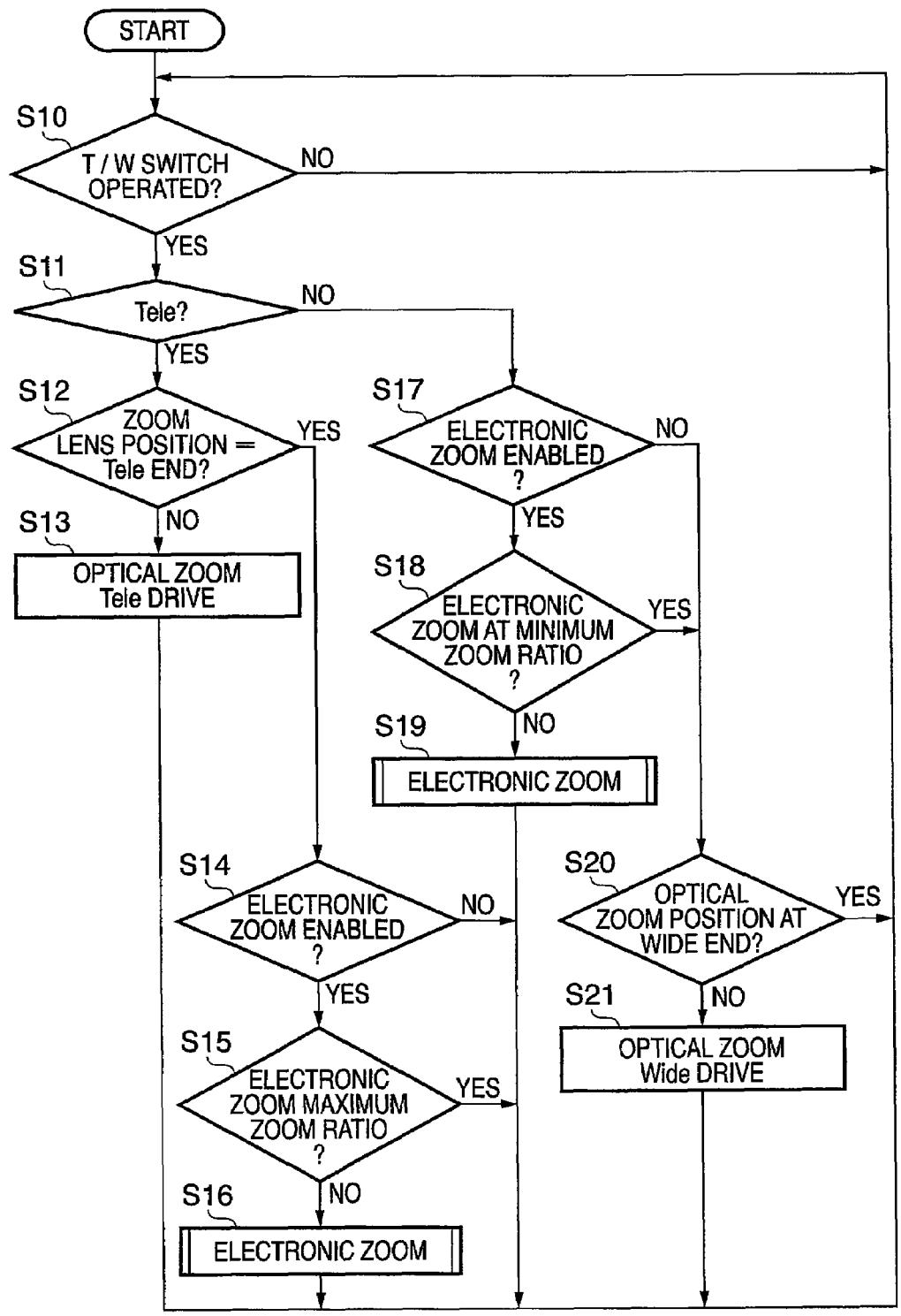
FIG. 4 is a flow chart illustrating control of switching between optical zoom and electronic zoom in an embodiment of the present invention.

FIG. 4 is a flow chart illustrating control of switching between optical zoom and electronic zoom according to the first embodiment of the present invention.

When the T/W switch 22 is operated (YES in step S10), the zoom direction is identified (step S11). If the zoom direction is in the telephoto direction, then it is determined whether or not the position of the zoom lens 11 (hereinafter the "zoom lens position") is at the telephoto end (the position of maximum telephoto) (step S12). If the zoom lens position is not at the telephoto end, then optical zooming is performed until either operation of the T/W switch 22 stops or the zoom lens position reaches the telephoto end, in which the zoom lens 11 is moved toward the telephoto end, the angle of view is narrowed, and the image is enlarged (zoom-in). Then, once the operation of the T/W switch 22 stops or the zoom lens position reaches the telephoto end, the process returns to step S10 (step S13).

On the other hand, if the zoom lens position is at the telephoto end, then it is determined whether or not electronic zoom is enabled (step S14). If the electronic zoom is not enabled, then the process returns to the T/W switch operation identification of step S10. If the electronic zoom is enabled, then it is determined whether or not the electronic zoom is at maximum zoom ratio (maximum telephoto) (step S15). If the electronic zoom is at maximum zoom ratio then it is not possible to zoom-in any further, and therefore the process returns as is to the T/W switch 22 operation identification of step S10. It should be noted that, at this time, the user may be notified that the electronic zoom is at maximum zoom ratio. On the other hand, if the electronic zoom is not at maximum zoom ratio, then an electronic zoom operation is performed (step S16), after which the process returns to step S10. A detailed description of the electronic zoom operation is given later.

By contrast, if the identification of the T/W switch 22 operation in step S11 indicates that the zoom direction is in the wide-angle direction, it is then determined if electronic zoom is enabled (step S17), and if so, it is then determined whether or not the electronic zoom is at minimum zoom ratio (widest angle) (step S18). If the electronic zoom is at minimum zoom ratio, then the process proceeds to step S18. If the electronic zoom is not at minimum zoom ratio, then electronic zooming is performed (step S19), after which the process returns to step S10.

If electronic zoom is not enabled (NO in step S17), or if electronic zoom is enabled and is at minimum zoom ratio (YES in step S18), then the process moves to step S20. At step S20, it is determined whether or not the zoom lens 11 is at the wide-angle end (maximum wide-angle position). If the zoom lens position is at the wide-angle end, then the process returns as is to the identification of the T/W switch 22 operation of step S10 because the angle of view cannot be made wider (no further zoom-out). It should be noted that, at this time, the user may be notified that the zoom lens position is at minimum zoom ratio. On the other hand, if the zoom lens position is not at the wide-angle end, then optical zooming is performed and the zoom lens 11 is moved toward the wide-angle end in a zoom-out. This process is performed until either operation of the T/W switch 22 stops or the zoom lens position reaches the wide-angle end. Then, once either operation of the T/W switch 22 stops or the zoom lens position reaches the wide-angle end, the process returns to step S10.

According to the series of operations shown in FIG. 4 as described above when the zoom lens 11 is at the wide-angle end and an instruction to move in the telephoto direction is input from the T/W switch 22, the following operation is performed: Specifically, when optical zooming from the wide-angle end starts and the optical telephoto end is reached, only when the electronic zoom is enabled is a zoom-in process by electronic zoom performed until the maximum zoom ratio is reached. By contrast, when the zoom lens 11 is at the telephoto end and an instruction to move in the wide-angle direction is input from the T/W switch 22, the following operation is performed: Specifically, when an electronic zoom operation starts from the telephoto end and the limit of image processing is reached, an optical zoom operation starts, zooming out until the optical wide-angle end is reached. In other words, in moving in the telephoto direction the zoom lens is moved first, whereas in moving in the wide-angle direction and the electronic zoom is enabled the electronic zoom is moved first. By switching between optical zoom and electronic zoom in this manner, deterioration in picture quality due to signal processing in the electronic zoom can be reduced.

Basic Concept of and Problem with Electronic Zoom

In the present invention, during electronic zoom a plurality of different drive methods is used to read the pixels. The following describes some possible controls for switching between drive methods and their problems.

In the present embodiment, the method used to read from the image sensing element 15 involves four different drive methods, from drive A through drive D, to read an image signal. Here, drive A is a drive method that reads four lines of pixel signals from substantially all regions of the image sensing element 15 as one line of pixel signals, and drive B is a drive method that reads three lines of pixel signals from a range narrower than that of drive A as one line of pixel signals. Drive C is a drive method that reads two lines of pixel signals from a range narrower than that of drive B as one line of pixel signals, and drive D is a drive method that reads one line of pixel signals from a range even narrower than that of drive C as one line of pixel signals. In this case, the relation between the sizes of the angles of view is such that drive A>drive B>drive C>drive D, with drive A presenting the widest angle of view and drive D providing maximum telephoto. The relation between the resolutions of the read image data is such that drive A<drive B<drive C<drive D.

It should be noted that, as described above, in each respective drive method, it is necessary to take steps to ensure that the center of gravity between the colors of the Bayer array in the image signal obtained is not drastically skewed.

Figure 6A:
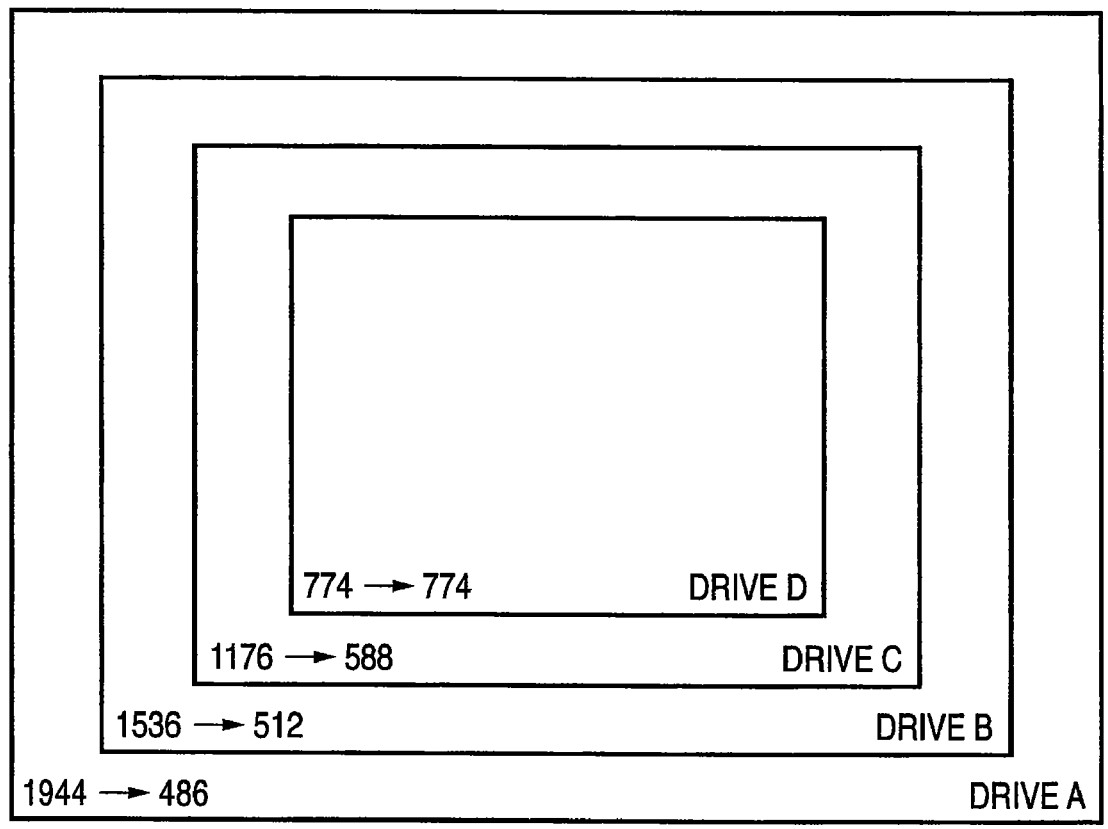
FIGS. 6A and 6B are schematic diagrams of angles of view and reading regions of the image sensing element according to an embodiment of the present invention.

FIG. 5 and FIG. 6A show the reading regions for each of drives A through D on the space above the image sensing element 15. FIG. 5 shows a case in which, for reasons having to do with circuit scale and the like, addressing is possible only in the vertical (line) direction, whereas FIG. 6A shows an instance in which addressing is possible in both the vertical (line) direction and the horizontal (column) direction. Moreover, FIGS. 5 and 6A show an image sensing element with the equivalent of 5 million pixels, reading a number of lines needed to generate a VGA (640×480) moving image. In this case, the number of vertical lines of the effective pixels of the image sensing element amounts to 1944.

In addition, when generating an image for display that becomes the basis for a VGA moving image, an increase in the number of lines read from the image sensing element 15 of 20 to 30 percent is assumed not to result in very great deterioration in the picture quality even with the expanded processing necessitated by signal processing (interpolation). As an example, when performing an approximately 26 percent increase interpolation, the minimum number of lines required to be read from the image sensing element 15 is 380 (=480÷1.26). Moreover, in order to reduce the reading time, it is preferable to the extent possible to read only pixels of a number of lines that does not exceed the 480 lines required for a VGA moving image. Bearing these conditions in mind, the drive methods for the electronic zoom enlargement ratios may be controlled so as to produce the relation shown in TABLE 1.

TABLE 1

| Drive | Reading method | Adaptable zoom ratio | Number of lines read | Number of lines output | Corresponding number of lines |
|---|---|---|---|---|---|
| A | 4 lines → 1 line | Up to 1.28 | 1944 | 486 | 1944-1520 |
| B | 3 lines → 1 line | 1.28-1.71 | 1536 | 512 | 1536-1140 |
| C | 2 lines → 1 line | 1.71-2.56 | 1176 | 588 | 1176-760 |
| D | 1 line → 1 line | 2.56-5.12 | 774 | 774 | 774-380 |

In TABLE 1, the "adaptable zoom ratio" is the zoom ratio applied by each drive method to maintain picture quality, and the "number of lines read" is the number of lines read by each drive method out of the 1944 lines available. The examples shown in FIGS. 5 and 6A show the number of lines of a central portion region from which the top and bottom regions have been cut away. The "number of lines output" indicates the number of lines actually output from the number of lines read by each drive method. The "corresponding number of lines" represent the angle of view that can be accommodated while maintaining picture quality by carrying out signal processing of the image signal of the output lines portion (in this case, an increase of approximately 26 percent in the read image signal), converted into the number of lines.

Figure 6B:
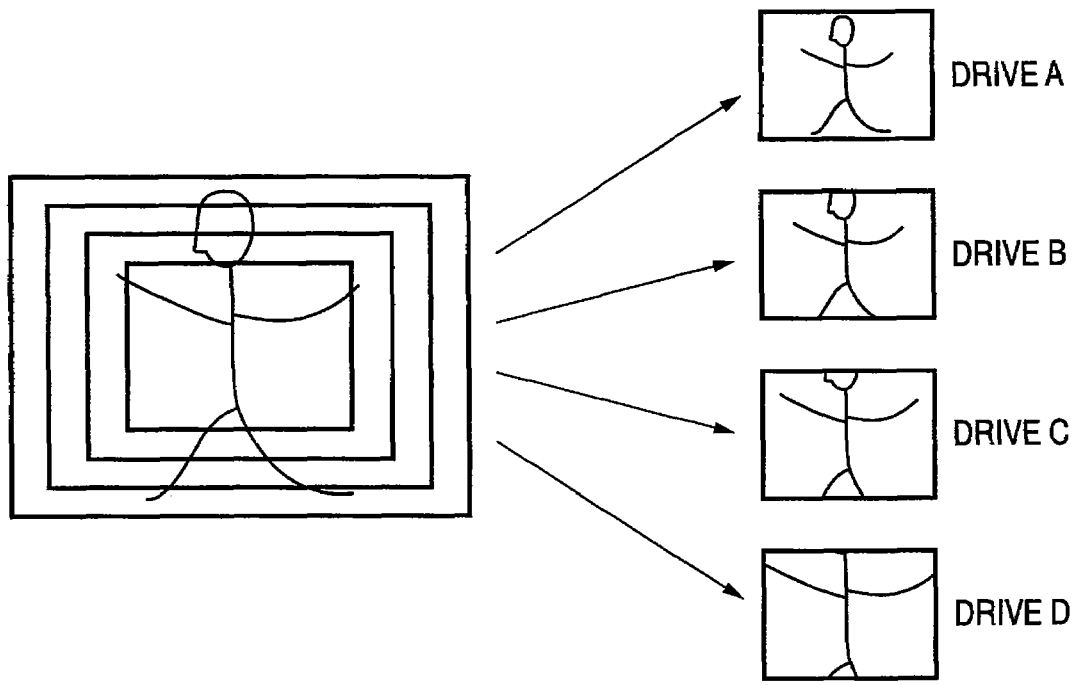

FIG. 6B shows schematically the angle of view of the image obtained when reading the number of lines read by each of drives A-D as shown in TABLE 1.

A description is now given of an example of drive method switching control based on TABLE 1.

Where there is an instruction for further zoom-in input from the T/W switch 22 from a state of optical zoom maximum telephoto in which the optical zoom is at the telephoto end, first, the zoom ratio for the optical zoom maximum telephoto image is identified. Then, depending on that identification, the system control circuit 24 adjusts the timing pulse generator 16 and sets the reading method and the number of lines to be read from the image sensing element 15. Specifically, if the zoom ratio is up to 1.28×, under drive A, which is the method in which four lines are read as one line, 1933 lines are read. If the zoom ratio is from 1.28× to 1.71×, under drive B, which is the method in which three lines are read as one line, 1536 lines are read. Similarly, if the zoom ratio is from 1.71× to 2.56×, under drive C, which is the method in which two lines are read as one line, 1176 lines are read. If the zoom ratio is from 2.56× to 5.12×, under drive D, which is the method in which one line is read as one line, 774 lines are read.

The image signals of these 486, 512, 588 and 774 line portions read under drives A through D, respectively, are further cropped by the image processor 19 and if necessary reduced or interpolated (enlarged) to obtain the angle of view specified according to the zoom ratio.

Designing an electronic zoom that gives priority to picture quality as described above reduces the added pixel data ratio of the image data in the process of generating an image for display from the output image signal, and therefore can reduce deterioration in and stabilize picture quality. On the other hand, however, as the number of lines to be read increases, depending on the drive method the processing needed for one line of output also increases as does the time required. Consequently, if the image signals are read at the same drive frequency, the rate of data output from the image sensing element 15 changes depending on the drive (A, B, C or D).

Further, although a higher-quality image can be obtained in each frame by changing the read drive as shown in TABLE 1 depending on changes in the zoom ratio, a problem arises in that the images do not tie together smoothly when switching between drive modes. This problem occurs because, in the present embodiment, images are read from the image sensing element 15 by one of four different drive methods (drives A-D), and in each of these drives A through D the time needed to read and output the image signal from the image sensing element 15 varies. This variation arises because the number of lines read is different for each drive and also because the time needed for processing is different because the number of lines output for the number of lines read varies. A description of this problem is given with reference to FIG. 7.

Figure 7:
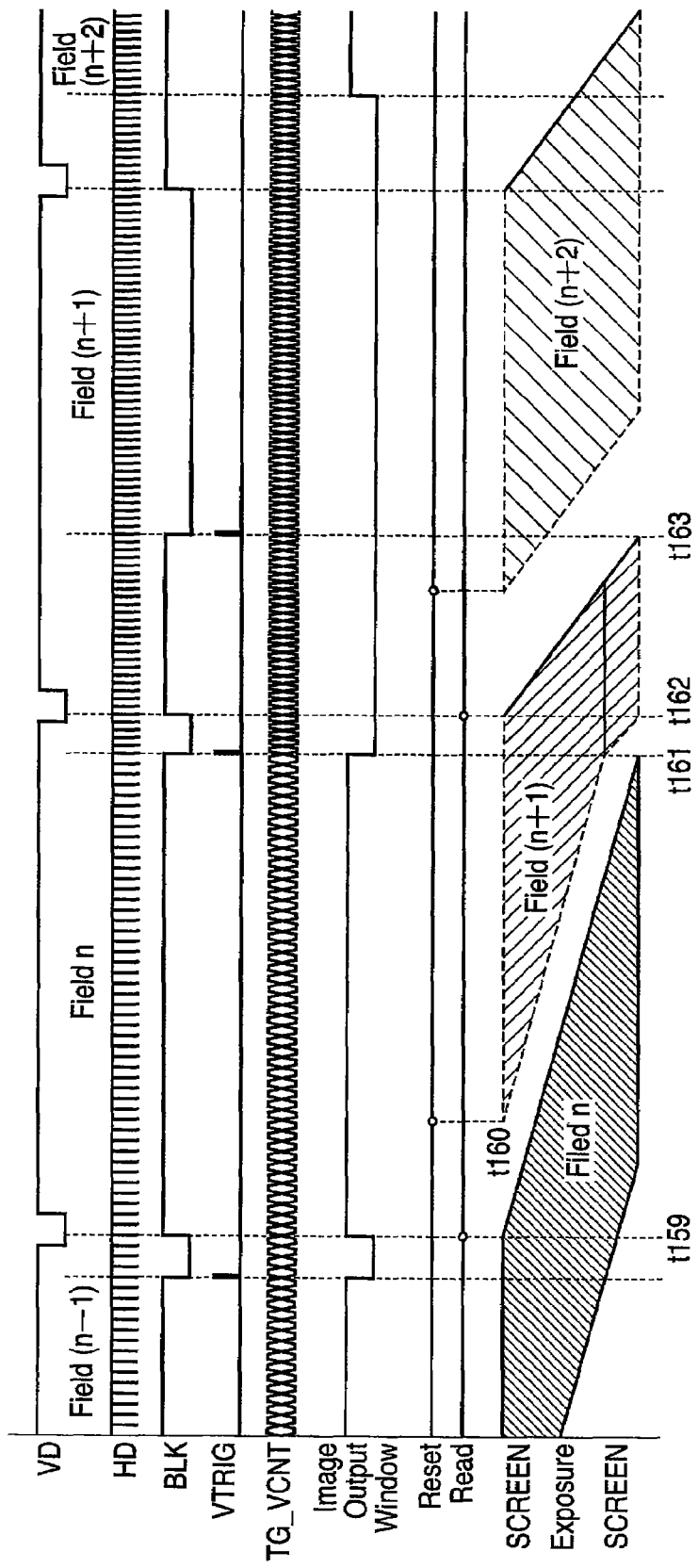
FIG. 7 is a timing chart illustrating problems when switching between drive modes for driving the image sensing element.

FIG. 7 is a timing chart showing the output of the image sensing element 15 when switching drives during a rolling shutter operation.

In FIG. 7, the image data read in field n is data that is accumulated beginning immediately after resetting after reading of the electrical charges of each line in field (n−1). Moreover, in field n, after reading of the image data starts, from the start of reset at a time t160 the accumulation of the image data of field (n+1) is carried out in units of lines. Here, a switch in drives is made between t161, when the reading of field n ends, and t162, when the reading of field (n+1) begins, in which the change is from one drive method to another drive method with a faster read speed.

When there is a change in read speed as in this case, whereas reading and reset are carried out in t159-t161 when reading field n, by contrast, when reading field (n+1) reading finishes within the short time t162-t163. As a result, as can be understood from FIG. 7, the accumulation time in field (n+1) changes with each line, creating an image in which there is a difference in brightness between the top of the screen and the bottom of the screen, with the top of the screen light and the bottom of the screen dark. Conversely, when changing from one drive method to another drive method having a slower read speed, an image is produced in which the top of the screen is dark and the bottom of the screen is light.

Thus, as described above, when switching drive methods, one frame's worth of an image with unnatural brightness is displayed, creating a feeling of incongruity.

Speed Priority Mode and Image Quality Priory Mode

In light of the problem described above, the present embodiment uses multiple operating modes, switching between them so as to control the electronic zoom. In this embodiment, there is a speed priority mode for when the zooming speed is fast and an image quality priority mode for when the zooming speed is slow.

As a method of setting the operating mode of the electronic zoom, two possible types like the following are possible. One method involves having a program controlled by the CPU of the system control circuit 24 automatically determine the zooming speed according to the degree of operation of the T/W switch 22 and set the operating mode. The other method involves providing means for allowing the operating mode of the electronic zoom to be set and stored in the image sensing apparatus, with the user then setting the operating mode.

Figure 8:
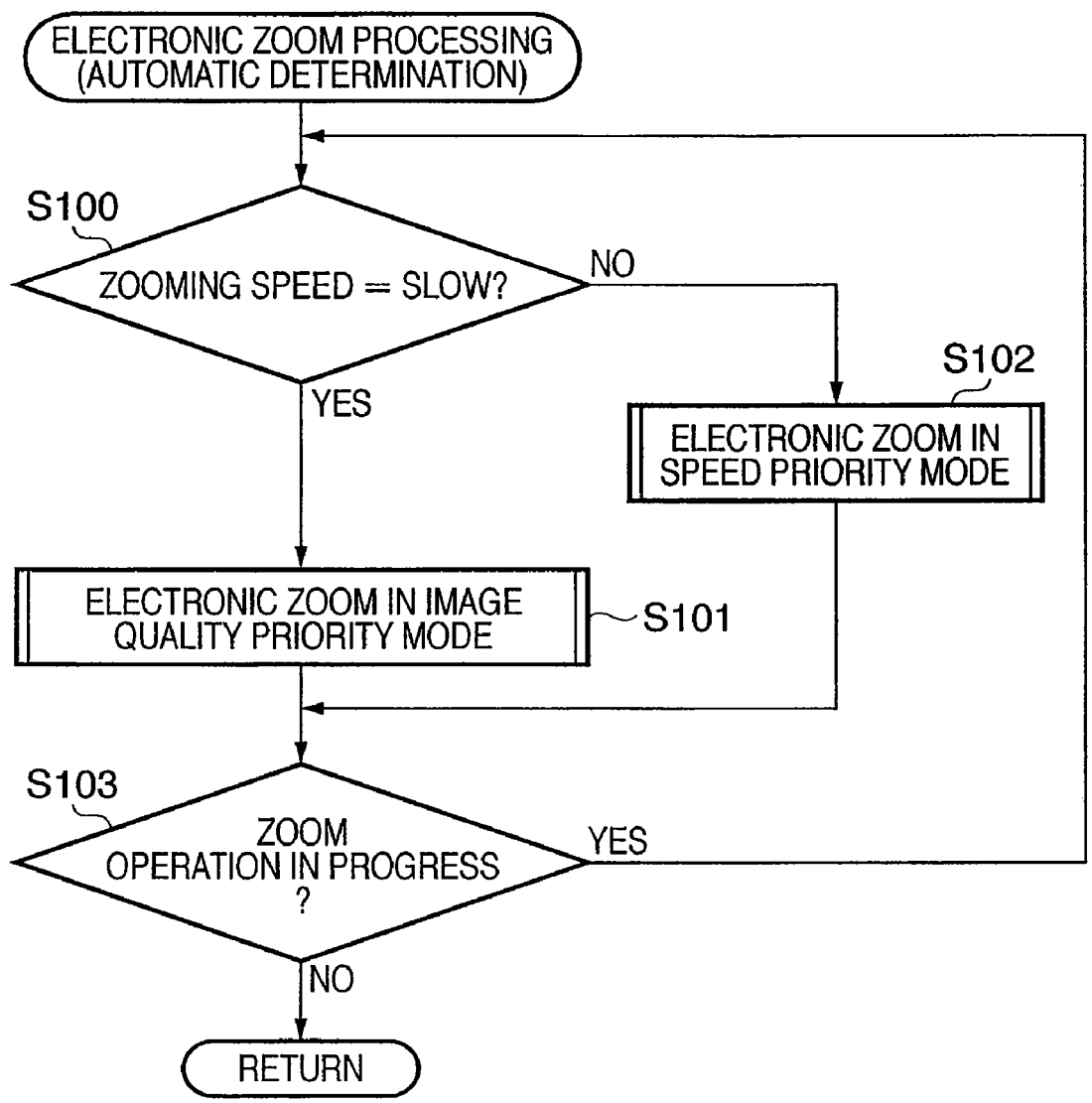
FIG. 8 is a flow chart illustrating an electronic zoom process when switching between an image quality priority mode and a speed priority mode depending on zooming speed according to an embodiment of the present invention.

First, a description is given of automatically determining the operating mode of the electronic zoom depending on the degree of operation of the T/W switch 22, with reference to FIG. 8. It should be noted that this process is performed in steps S16 and S19 shown in FIG. 4.

According to A/D conversion results obtained from the degree of operation of the T/W switch 22 having the configuration shown in FIG. 2B, it is determined whether or not the zooming speed is slow (step S100). It should be noted that the determination whether or not the zooming speed is slow may, for example, be accomplished by obtaining the angular velocity of the T/W switch 22 based on the digital signals of the A/D converter inside the T/W switch 22 and comparing the obtained angular velocity with a given angular velocity. If it is determined that the zooming speed is slow, then electronic zoom is performed in the image quality priority mode (step S101). If it is determined that the zooming speed is fast, then electronic zoom is performed in the speed priority mode (step S102). After each process is finished, it is then determined whether or not the T/W switch 22 continues to be operated (step S103). If the T/W switch 22 continues to be operated, processing returns to step S100, and if not the electronic zoom process is finished and processing returns to the process shown in FIG. 4.

Figure 9:
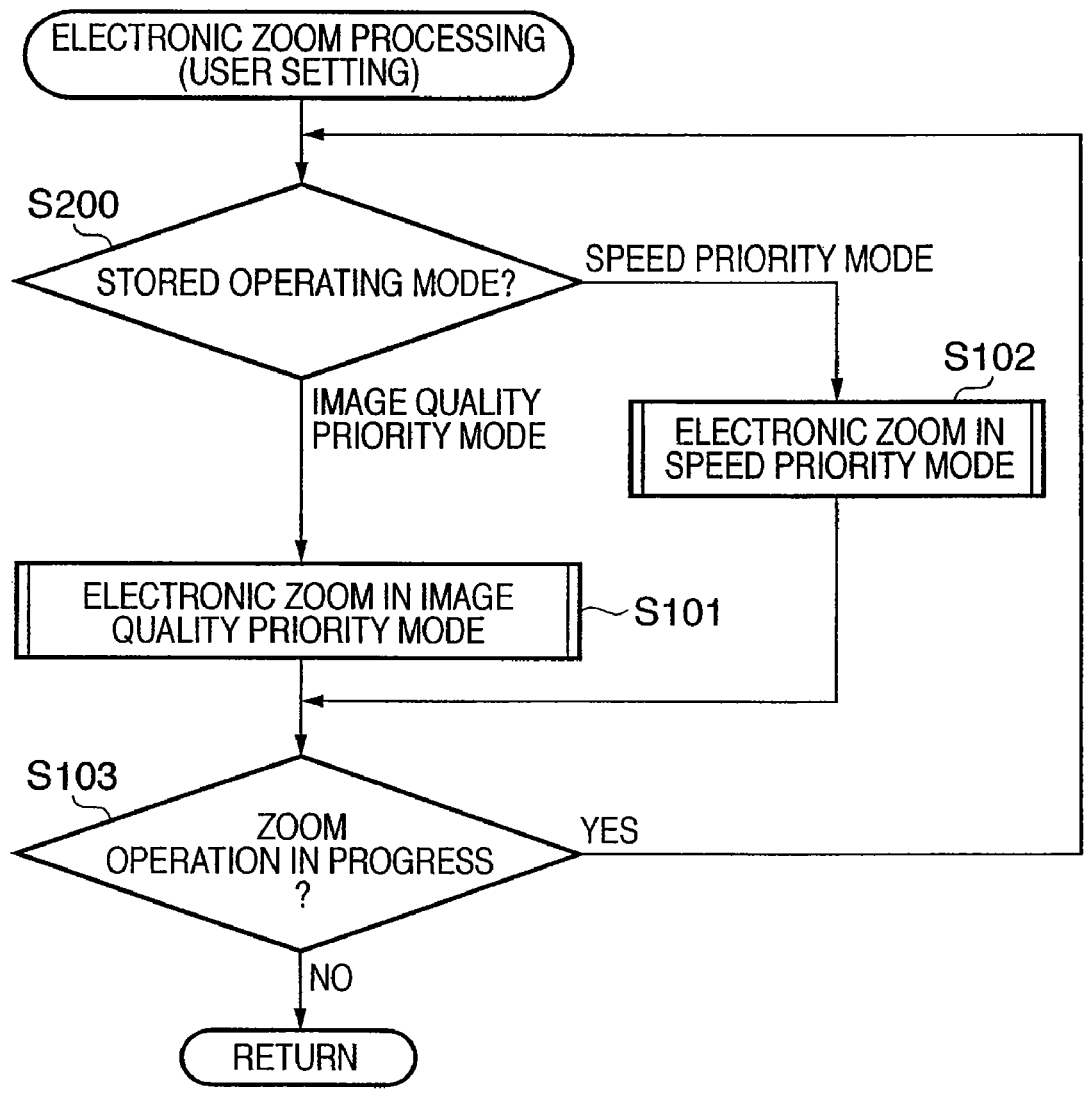
FIG. 9 is a flow chart illustrating an electronic zoom process when switching between the image quality priority mode and the speed priority mode according to a user setting according to an embodiment of the present invention.

By contrast, a description is now given of a process in which the user sets and stores the electronic zoom operating mode (user setting), with reference to FIG. 9. It should be noted that, in the case of this user setting, prior to operating the T/W switch 22 the following process is performed: First, a plurality of operating switches, not shown, connected to the system control circuit 24 and a bit map signal drawn in the memory 26 by the system control circuit 24 are displayed as a GUI on the display unit 51 (the latter through the reproduction circuit 50). Using this GUI, the user selects and sets either the image quality priority mode or the speed priority mode and those results are stored in a predetermined setting storage area of the flash memory 25.

When conducting the electronic zoom of steps S16 and S19 shown in FIG. 4, the CPU of the system control circuit 24 reads the electronic zoom operating mode stored in the setting storage area of the flash memory 25 and determines whether it is the image quality priority mode or the speed priority mode (step S200). Then, if the electronic zoom operating mode is determined to be the image quality priority mode, electronic zoom is carried out in the image quality priority mode (step S101). If the electronic zoom operating mode is determined to be the speed priority mode, electronic zoom is carried out in the speed priority mode (step S102). After each process is finished, it is then determined whether or not the T/W switch 22 continues to be operated (step S103). If the T/W switch 22 continues to be operated, processing returns to step S200, and if not, the electronic zoom process is finished and processing returns to the process shown in FIG. 4.

It should be noted that, when setting the operating mode by user setting, if the image quality priority mode is set the angle of view zooming speed is limited to slow regardless of the degree of operation of the T/W switch 22, and if the speed priority mode is set the zooming speed is given priority.

Figure 10B:
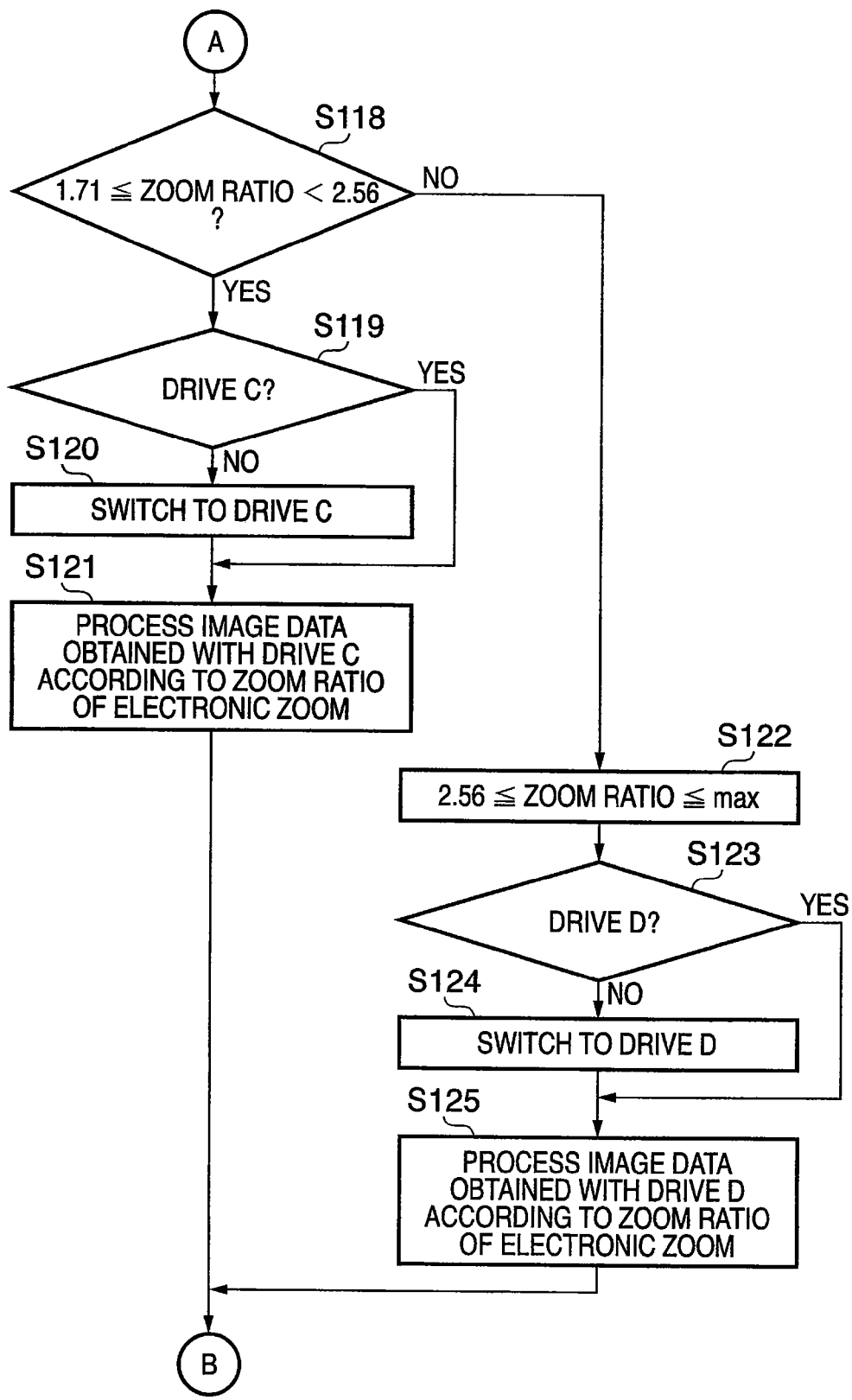
FIG. 10 is a flow chart illustrating an electronic zoom process in the image quality priority mode according to a first embodiment of the present invention.
Figure 11A:
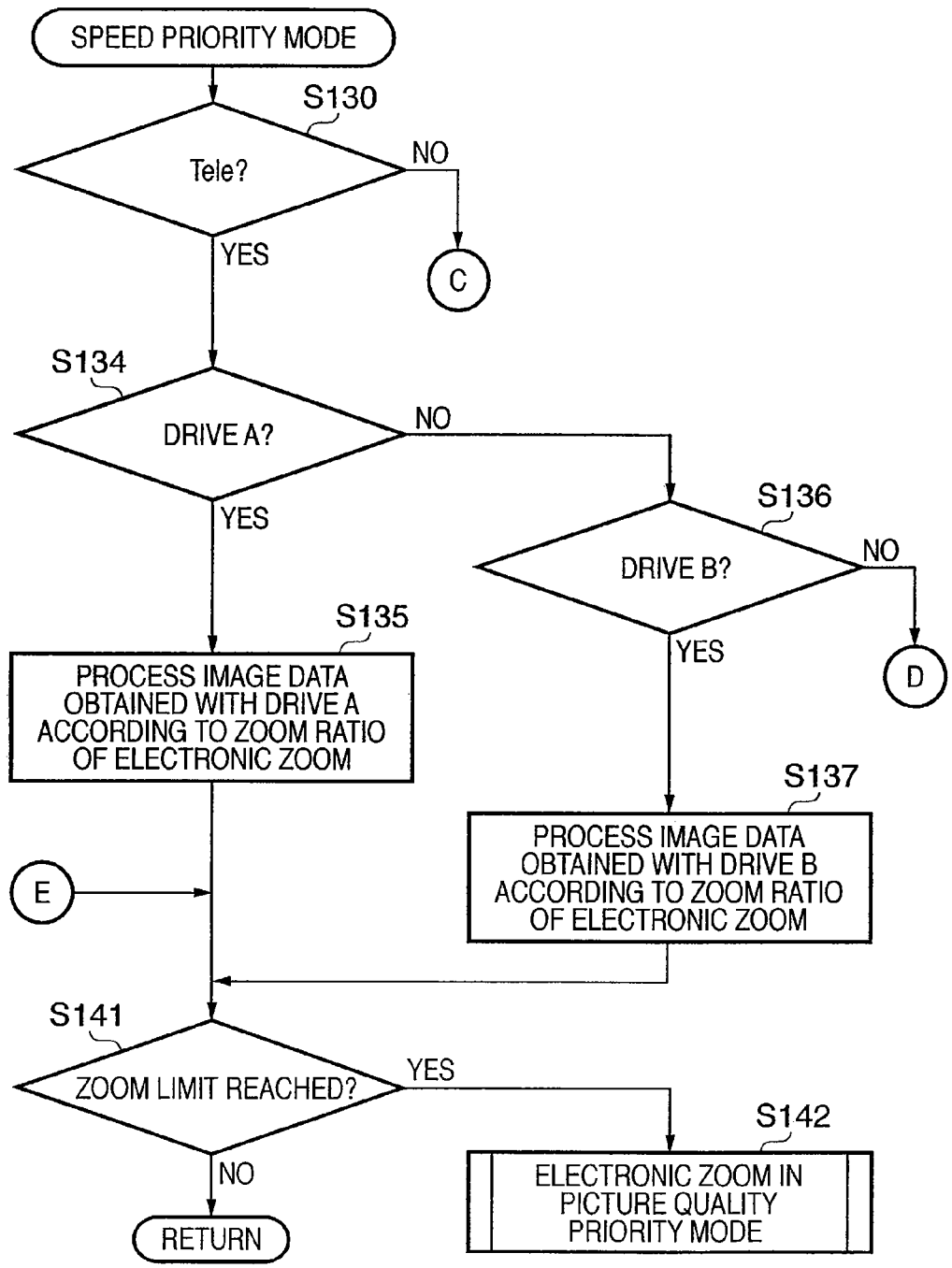
FIG. 11 is a flow chart illustrating an electronic zoom process in the speed priority mode according to the first embodiment of the present invention.
Figure 11B:
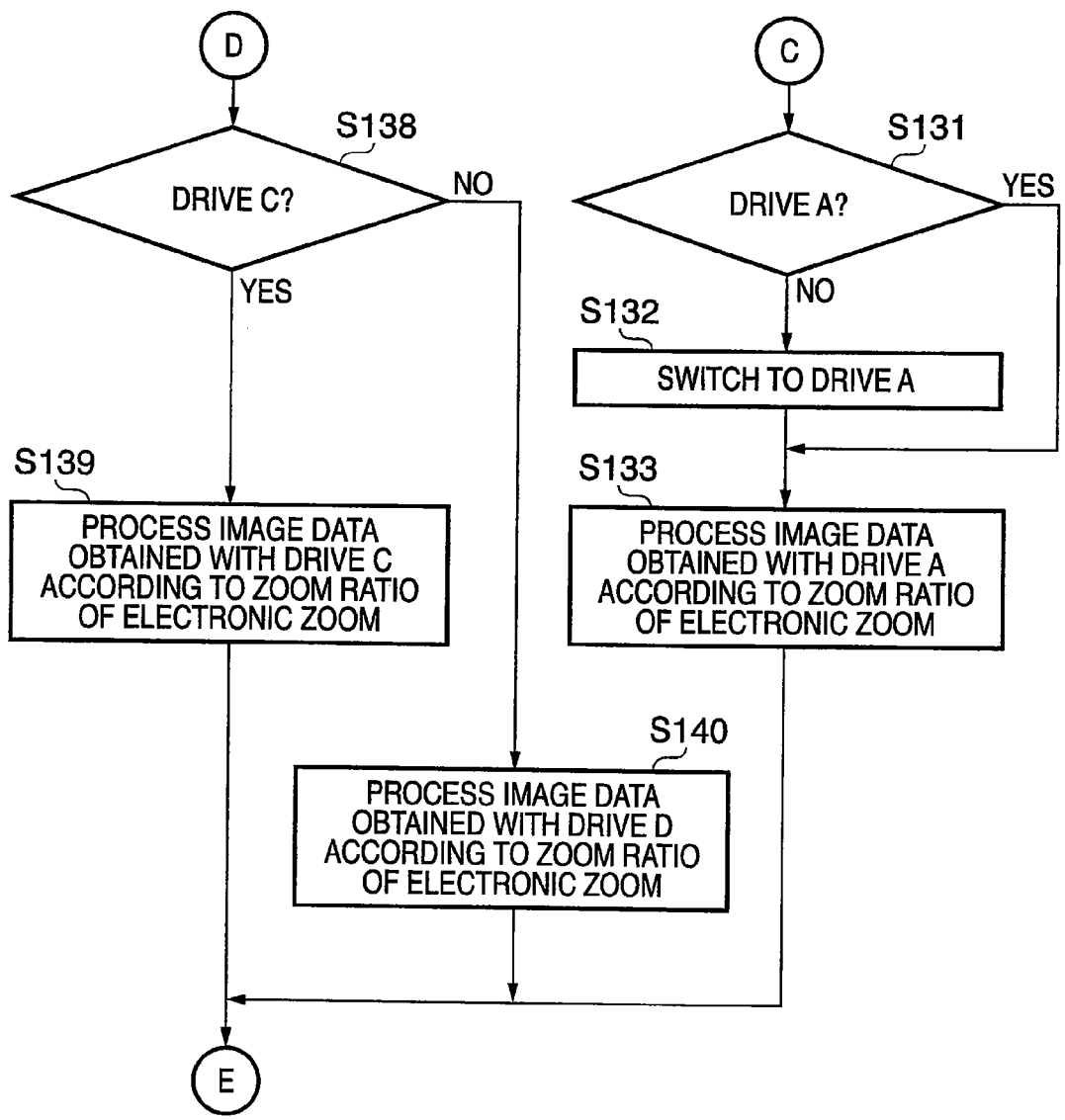

Next, a detailed description is given of the electronic zoom process in both the image quality priority mode and the speed priority mode, with reference to FIG. 10, FIG. 11 and TABLE 1.

Image Quality Priority Mode

FIG. 10 is a flow chart showing the electronic zoom process when the zooming speed determined by the degree of operation of the T/W switch 22 is slow or when the operating mode of the electronic zoom set by the user is the image quality priority mode. This process is performed in step S101 shown in FIG. 8 and FIG. 9.

First, the zoom ratio of the electronic zoom is confirmed. If the zoom ratio of the electronic zoom is less than 1.28× (step S110), it is then determined whether or not the drive is set to drive A (step S111). If not, the drive is set to drive A (step S112) and processing then proceeds to step S113. If the drive is already set to drive A (YES in step S111), processing proceeds as is to step S113. Then, the image obtained from the image sensing element 15 with drive A is then further changed by the reduction circuit inside the image processor 19 according to the zoom ratio of the electronic zoom to generate an image for display (step S113). It should be noted that, during moving image recording, the generated image for display is compressed by the compression circuit inside the image processor 19.

Similarly, if the zoom ratio is 1.28× or more but less than 1.71× (YES in step S114), the same processes as in steps S111-S113 described above are performed with drive B (steps S115-S117). Similarly, if the zoom ratio is 1.71× or more but less than 2.56× (YES in step S114), the same processes as in steps S111-S113 described above are performed with drive C (steps S119-S121). Additionally, if the zoom ratio is 2.56× or more but equal to or less than the maximum zoom ratio (5.12×) (step S122), the same processes as in steps S111-S113 described above are performed with drive D (steps S123-S125).

Then, the images generated in steps S113, S117, S121 or S125 are displayed every other frame (step S126). In addition, the drive switching processes of steps S112, S116, S120 and S124 are performed between a field used as a display image and a field not used as a display image. Described with reference to FIG. 7, if an image for display is generated in field n, driving is switched after the reading of field n is finished and the data output in field (n+1) is not used for display.

In the image quality priority mode, either the speed of the change in the angle of view is slow or the user wishes to view the content of the image more closely than when changing the angle of view. Accordingly, in addition to switching to the optimal drive method according to the zoom ratio the images are displayed every other frame and the drive method is switched in a frame in which the image is not displayed in order to not display an image in which there is a difference in brightness between top and bottom of the image during switching. Particularly when the speed of change in the angle of view is slow, the change in the angle of view between displayed frames is not very noticeable even when displaying images every other frame.

After the display of step S126 is finished, processing returns to the processes shown in FIG. 8 or FIG. 9.

Thus, as described above, the display refresh rate is halved in the image quality priority mode, and therefore it is also possible to increase the drive frequency in order to increase the number of frames per second. In addition, a reduced power mode may be set and stored like the electronic zoom drive modes described above, such that, when the reduced power mode is set, the display refresh rate may be lowered without increasing the drive frequency. The drive frequency may then be increased and the display refresh rate increased only when the reduced power mode is not set.

Speed Priority Mode

FIG. 11 is a flow chart showing the electronic zoom process when the zooming speed determined by the degree of operation of the T/W switch 22 is fast or when the operating mode of the electronic zoom set by the user is not the image quality priority mode. This process is performed in step S102 shown in FIG. 8 and FIG. 9.

First, the direction of zoom of the T/W switch 22 is identified (step S130). If the direction of zoom is in the wide-angle direction, it is then determined whether the current drive is drive A (step S131), and the drive switched to drive A only if the current drive is not drive A (step S132). When drive A is confirmed, the image obtained from the image sensing element 15 in drive A is further changed by the reduction circuit in the image processor 19 according to the zoom ratio of the electronic zoom, an image for display generated (step S133), and processing then proceeds to step S141. It should be noted that, during image recording, the generated image for display is compressed by the compression circuit inside the image processor 19.

By contrast, if the zoom is in the telephoto direction (YES in step S130), the current drive method is confirmed. If the current drive is drive A (YES in step S134), the image obtained from the image sensing element 15 in drive A is changed by the reduction circuit inside the image processor 19 according to the zoom ratio of the electronic zoom, an image for display generated (step S135), and processing then proceeds to step S141. Similarly, drive B, drive C and drive D are identified (steps S136 to S138), images for display are generated for the images obtained by each drive (steps S137, S139, S140), and processing then proceeds to step S141.

In the speed priority mode, either the speed of change in the angle of view is fast or the user wishes to give priority to changing the angle of view. As a result, there is no display of images of every other frame as in the image quality priority mode. Instead, although there might be some diminution in picture quality, an image for display is generated in such a way that the user can see the change in the angle of view in real time by processing performed by the image processor 19 without changing the drive method.

Therefore, an image for display having the angle of view specified by the operation of the T/W switch 22 is generated by processing performed by the image processor 19 on the image data obtained without changing the drive method while the T/W switch 22 is being operated in the telephoto direction. Moreover, when the T/W switch 22 is operated in the wide-angle direction, first, with the electronic zoom drive A, which can read an image with the widest angle of view, is employed, thus eliminating the need to switch drive methods during zooming.

In step S141, it is confirmed whether or not the zoom ratio has reached its maximum (maximum telephoto) or its minimum (widest angle of view), and if so, processing then proceeds to step S142 and electronic zooming is performed in the image quality priority mode. By contrast, if the zoom ratio has reached neither its maximum nor its minimum, processing returns to the processes shown in FIG. 8 or FIG. 9.

Thus, as described above, according to the first embodiment of the present invention, by changing the drive mode of the electronic zoom when giving priority to image quality and when giving priority to speed, electronic zoom suited to the application can be achieved. In addition, in electronic zoom in the image quality priority mode, the zooming process is performed at every frame and the image displayed on the display unit is thinned in units of frames, making smooth image display possible during a zooming operation. Further, by selecting the electronic zoom mode depending on the zooming speed when changing the zooming speed by operating the T/W switch 22, the best image for the situation can be obtained. It should be noted that the zoom processing interval can be changed depending on the drive rate and the display rate as a matter of design convenience.

Second Embodiment

Next, a description is given of a second embodiment of the present invention.

The system configuration as well as the configuration and form of control of the image sensing element in the second embodiment are the same as those of the first embodiment, and therefore a description thereof is omitted. The second embodiment adds to the first embodiment a concentration on the viewing of the EVF image displayed on the display unit.

In the case of the first embodiment described above, with both electronic zoom control in the image quality priority mode and electronic zoom control in the speed priority mode, when the drive of the image sensing element 15 is switched a large difference occurs in perceived resolution of the EVF images displayed on the display unit before and after the switch. This phenomenon occurs because the amount of information involved differs depending on the size of the area of the image obtained from the image sensing element 15 that is used for the image for display. Specifically, speaking only of drive A, the perceived resolution is clearly higher when generating an image for display of 480 lines by using the image sensing output of 486 lines as is, unmagnified and unprocessed, than when extracting the central 380 lines of the image sensing output of 486 lines and generating an image for display of 480 lines. In other words, the perceived resolution declines because frequencies are lost due to linear interpolation by the reduction circuit of the image processor 19.

Here, a detailed description is given using the flow chart of electronic zoom in the image quality priority mode shown in FIG. 10. In the zoom process, if it is determined that the zoom ratio of the electronic zoom is less than 1.28× (YES in step S110), signal processing at the maximum zoom ratio of drive A is performed and an image for display is generated (step S113). If it is determined that zooming continues and is in progress (YES in step S103 shown in FIG. 8), drive A reading continues and frequencies drop out and the perceived resolution declines until the electronic zoom ratio becomes B. When the electronic zoom ratio is 1.28× or more (YES in step S114), the drive method switches to drive B (step S116). As zooming is carried out in drive B (step S127), the perceived resolution increases suddenly.

Figure 12A:
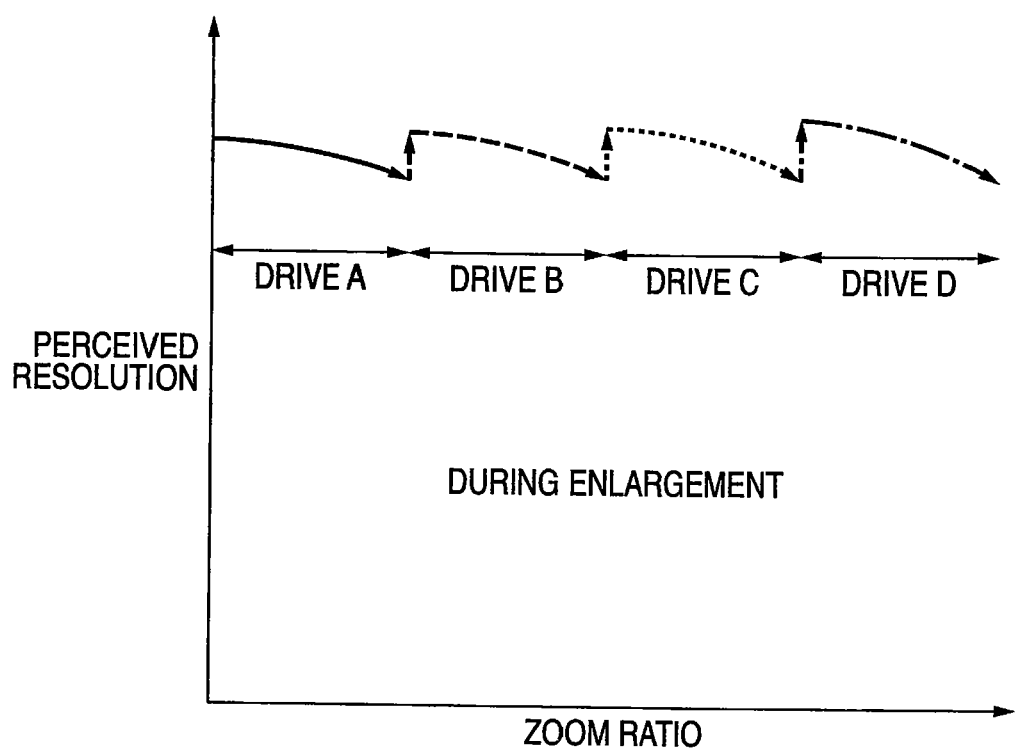
FIGS. 12A and 12B are schematic diagrams illustrating shifts in perceived resolution arising when switching drive methods in the image quality priority mode.
Figure 12B:
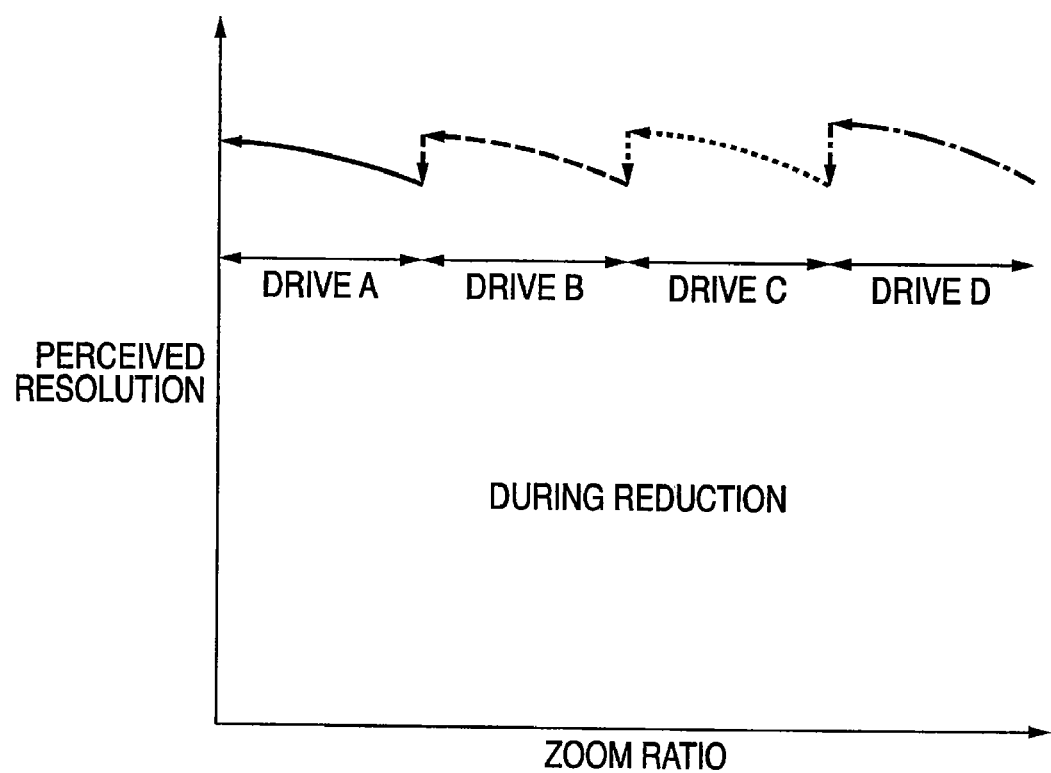

FIGS. 12A and 12B illustrate changes in perceived resolution in electronic zoom in the image quality priority mode. The number of lines read with each drive varies as shown in FIG. 5 and FIG. 6A, and therefore a slight difference arises in the maximum perceived resolution between the drives depending on the electronic zoom ratio.

FIG. 12A shows changes in perceived resolution when zooming in, in which the perceived resolution gradually declines as the image obtained with drive A is enlarged by image processing but recovers when the switch is made to drive B. Thereafter, similarly, the perceived resolution changes abruptly when the drive method switches.

FIG. 12B shows changes in perceived resolution when zooming out. Starting from the maximum zoom ratio of drive D, as the angle of view widens from a state in which the image is enlarged and the perceived resolution is degraded (that is, as the image is reduced), although the perceived resolution shifts in a direction of improvement up to the switch to drive C, when the switch is made to drive C the perceived resolution drops sharply. Thereafter, similarly, whenever the drive method changes the perceived resolution drops sharply.

Figure 13A:
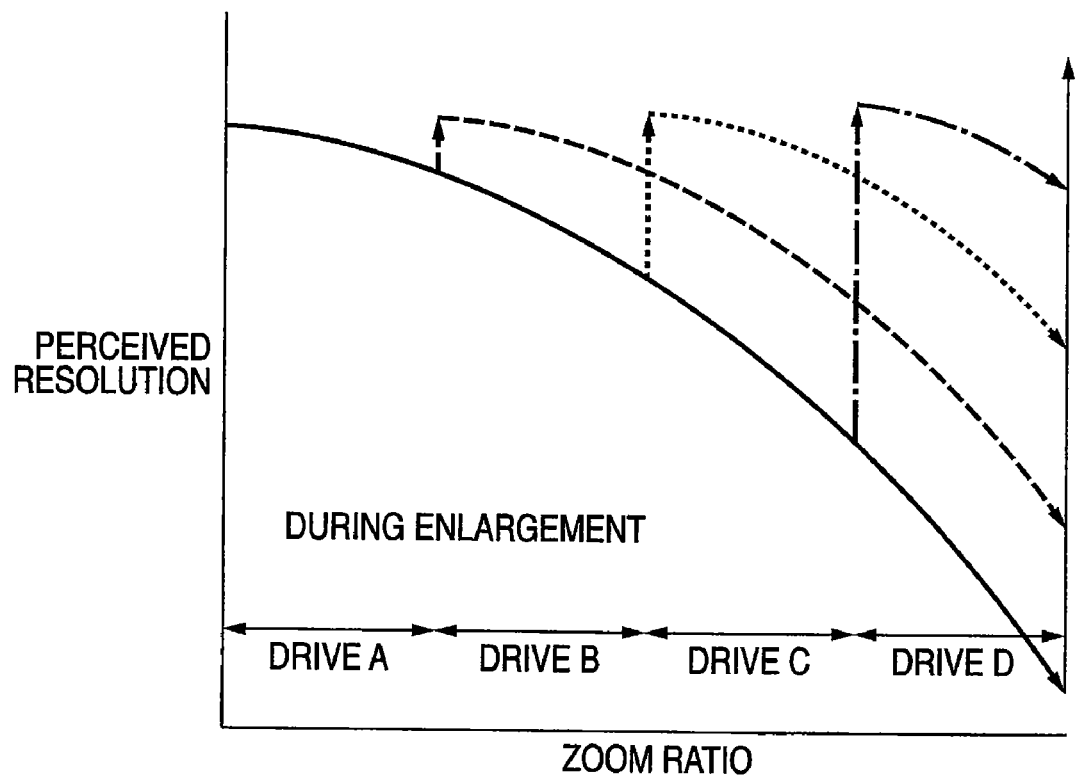
FIGS. 13A and 13B are schematic diagrams illustrating shifts in perceived resolution arising when switching drive method in the speed priority mode.
Figure 13B:
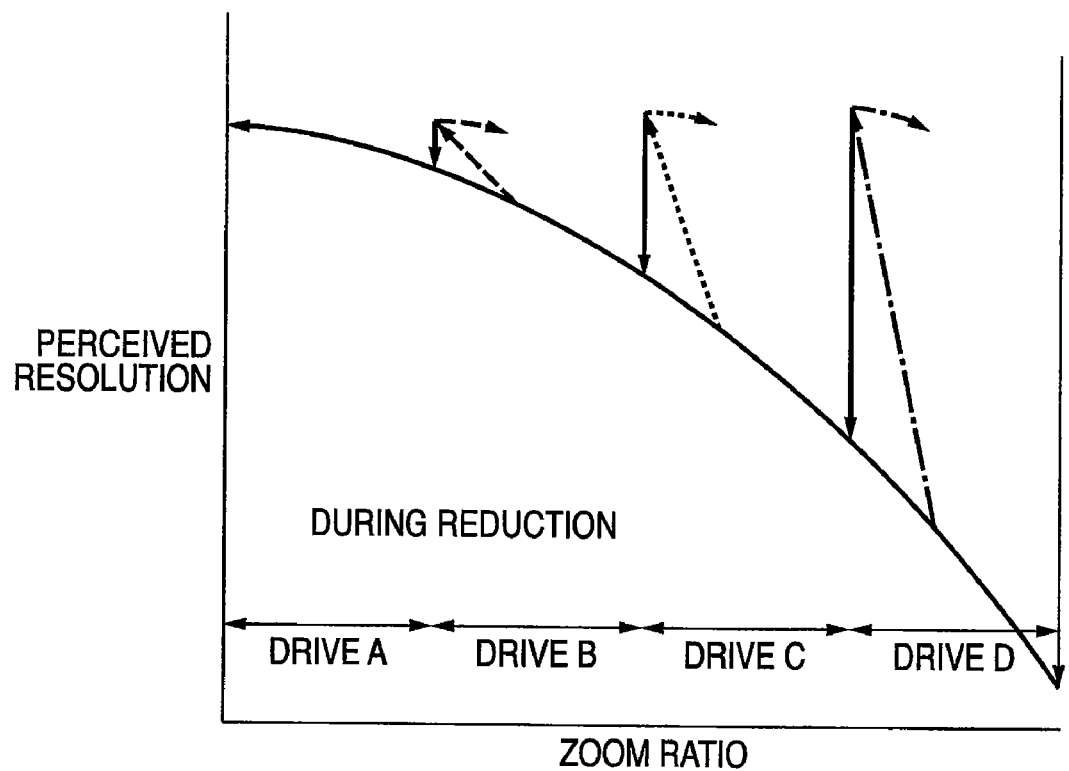

FIGS. 13A and 13B illustrate changes in perceived resolution in electronic zoom in the speed priority mode.

FIG. 13A shows changes in perceived resolution when zooming in, enlarging the image by image processing without changing the drive method from the start of zooming. After the zooming operation is released, because the drive method is switched to the best drive method for the zoom ratio, the perceived resolution increases suddenly. As shown in FIG. 13A, if the zooming operation is continued without a break from the zoom ratio for which drive A is used, the perceived resolution deteriorates the most sharply.

FIG. 13B shows shifts in perceived resolution when zooming out, switching to drive A at every zoom ratio and lowering the zoom ratio. After the zooming operation is released, because the drive method is switched and changed to the best drive method for the zoom ratio, the perceived resolution increases suddenly.

In light of the abrupt changes in perceived resolution described above, in the second embodiment of the present invention, in order to not impart a feeling of incongruity to the perceived resolution of the images for display, the coefficient (aperture coefficient) of an edge enhancement filter used in signal processing is changed and/or the focus lens 12 control position is changed. Aperture coefficients according to drive are set as shown in FIGS. 14A, 14B, 15A and 15B in order to smooth out the perceived resolution. Basically, the coefficient is used to heighten the perceived resolution degraded by the reduction circuit of the image processor 19.

Figure 14A:
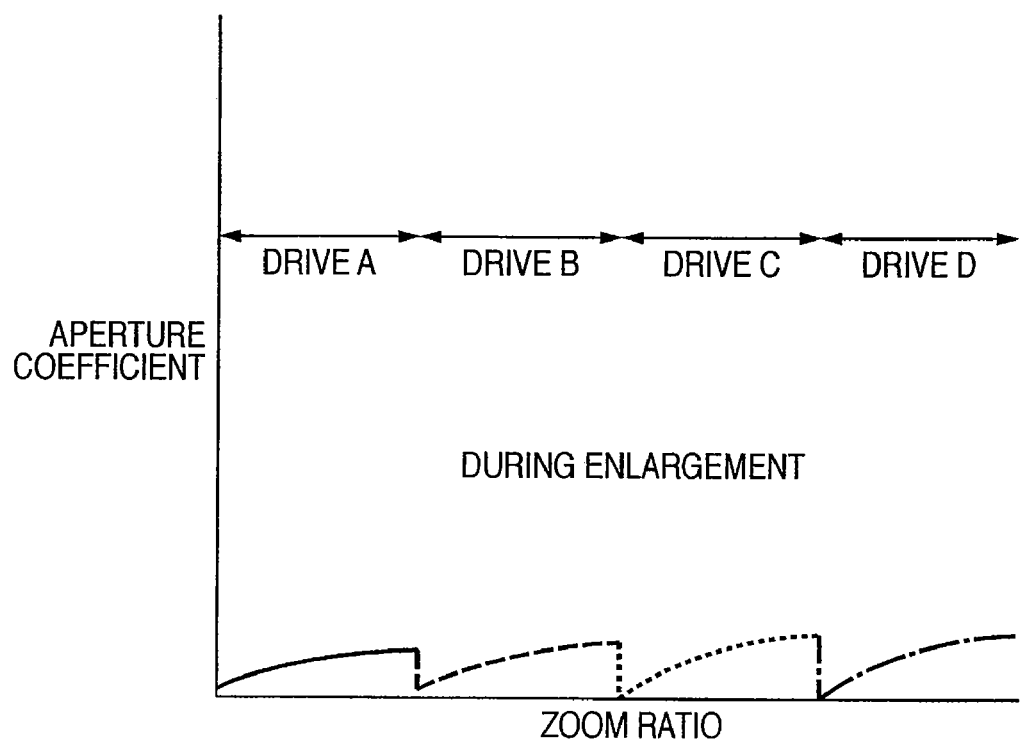
FIGS. 14A and 14B are schematic diagrams illustrating shifts in aperture coefficient depending on the drive method in the image quality priority mode according to a second embodiment of the present invention.
Figure 14B:
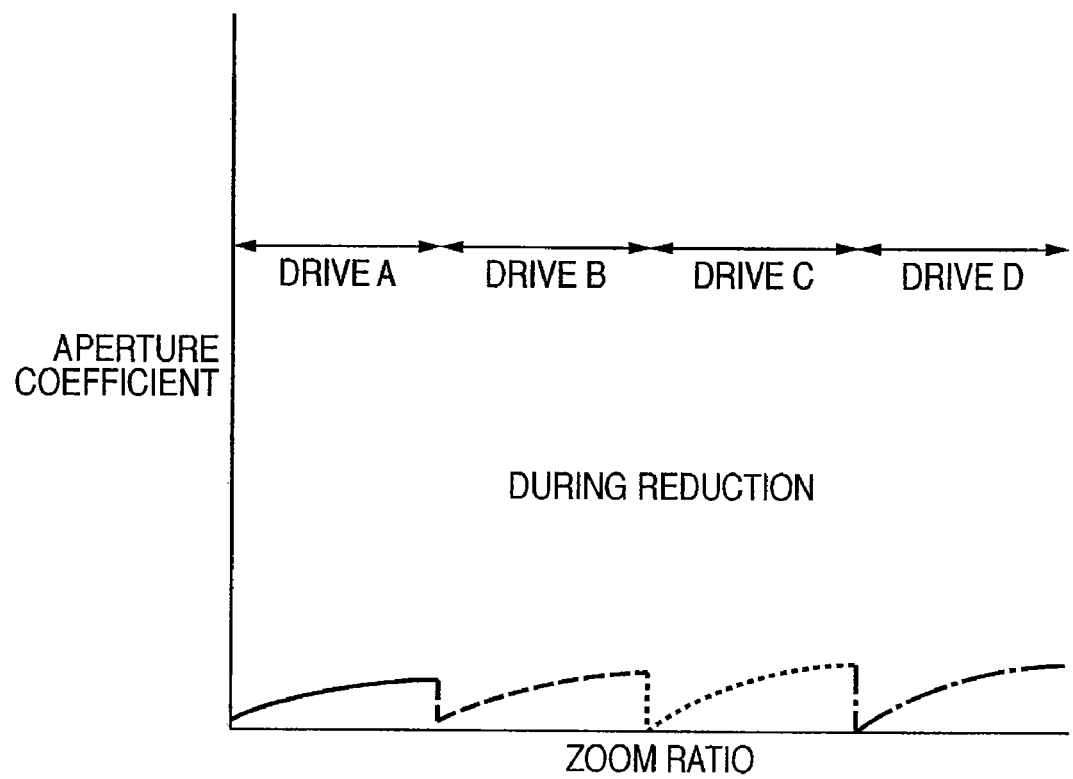
Figure 15A:
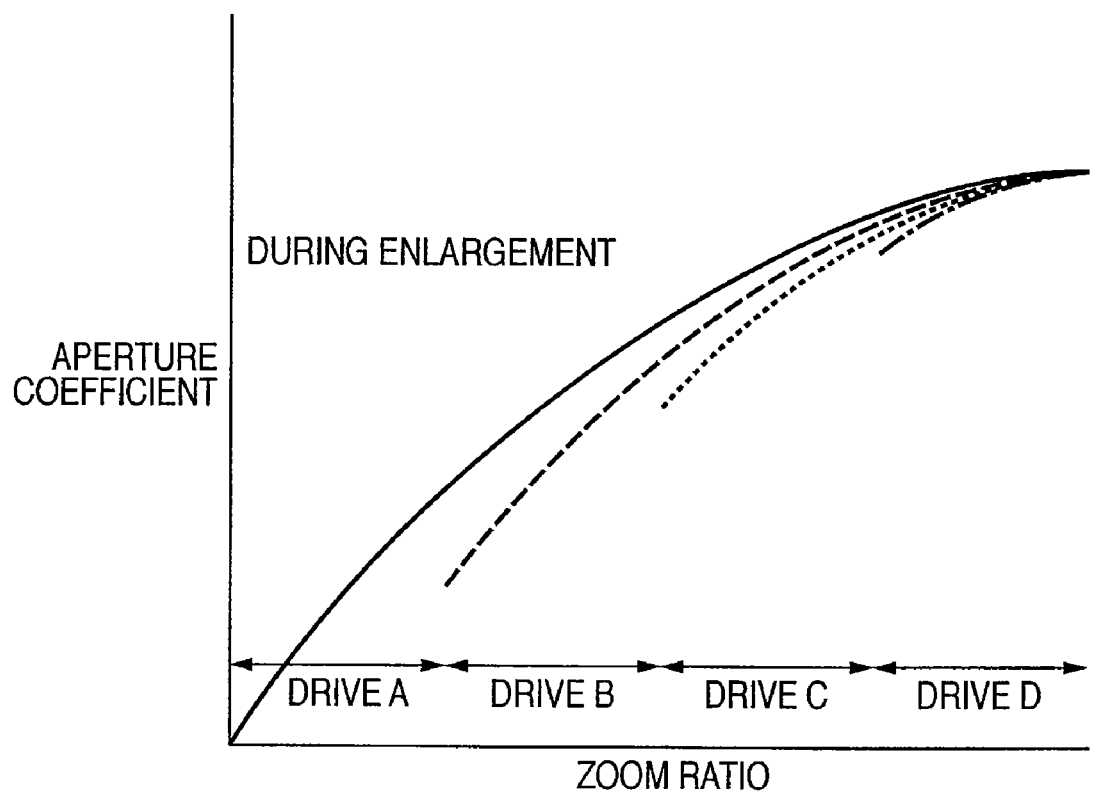
FIGS. 15A and 15B are schematic diagrams illustrating shifts in aperture coefficient depending on the drive method in the speed priority mode according to the second embodiment of the present invention.
Figure 15B:
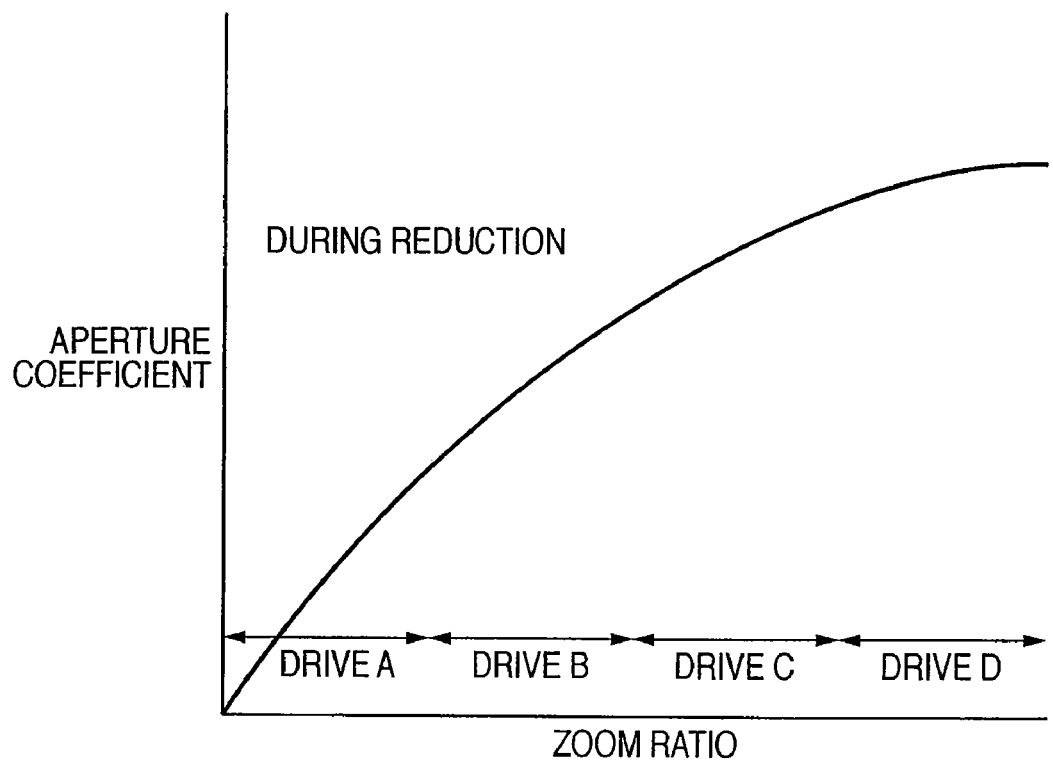

Using FIG. 14A as a representative example for purposes of description, the aperture coefficient is gradually increased in order to heighten the perceived resolution that is being gradually lost by zooming the image read in drive A. In addition, once the switch is made to drive B, the aperture coefficient is switched to match the drive and at the same time the aperture coefficient is gradually increased in accordance with the electronic zoom ratio. By repeating this setting, changes in the perceived resolution can be minimized.

A description is now given of the zoom operation in the second embodiment. In the second embodiment as well, the drive relation between optical zoom and electronic zoom are the same as shown in the flow chart shown in FIG. 4, and therefore a description thereof is omitted. In addition, the switching between the image quality priority mode and the speed priority mode by operation of the T/W switch 22 is the same as the process shown in the flow chart in FIG. 8 and the process of FIG. 9 of allowing the user to select using the GUI in the first embodiment, and therefore a description thereof is omitted.

Image Quality Priority Mode

FIG. 16 is a flow chart illustrating the electronic zoom process when either the zooming speed determined by the degree of operation of the T/W switch 22 is slow or the operating mode of the electronic zoom as set by the user is the image quality priority mode. This process is performed in step S101 shown in FIG. 8 and FIG. 9 described in the first embodiment.

First, the zoom ratio of the electronic zoom is confirmed. If the zoom ratio of the electronic zoom is less than 1.28× (step S210), it is then determined whether or not the drive is set to drive A (step S211), and if not (NO in step S211), the drive is set to drive A (step S212). Then, the aperture coefficient to be used in signal processing is changed according to the drive information (S213). In the image sensing element 15 drive described up to now, the size of the unmagnified and unprocessed image differs with each drive, and therefore there is a risk that the perceived resolution of the image for display also differs and can lead to the production of a succession of images that impart a feeling of incongruity. Accordingly, the aperture coefficient for the unmagnified and unprocessed image is changed for each drive.

Further, whether the drive method is changed or not, the aperture coefficient is corrected according to the electronic zoom ratio in drive A (step S214). Then, the image obtained from the image sensing element 15 with drive A is then further changed by the reduction circuit inside the image processor 19 according to the zoom ratio of the electronic zoom to generate an image for display (step S215). It should be noted that, during moving image recording, the generated image for display is compressed by the compression circuit inside the image processor 19.

Similarly, if the zoom ratio is 1.28× or more but less than 1.71× (YES in step S216), the same processes as in steps S211-S215 described above are performed with drive B (steps S217-S221). Similarly, if the zoom ratio is 1.71× or more but less than 2.56× (YES in step S222), the same processes as in steps S211-S215 described above are performed with drive C (steps S223-S227). Additionally, if the zoom ratio is 2.56× or more but equal to or less than the maximum zoom ratio (5.12×) (step S228), the same processes as in steps S211-S215 described above are performed with drive D (steps S229-S233).

Then, the images generated in steps S215, S221, S227 or S233 are displayed every other frame (step S234). In addition, the drive switching processes of steps S212, S218, S224 and S230 are performed between a field used as a display image and a field not used as a display image. Described with reference to FIG. 7, if an image for display is generated in field n, driving is switched after the reading of field n is finished and the data output in field (n+1) is not used for display.

After the display of step S126 is finished, processing returns to the processes shown in FIG. 8 or FIG. 9.

Speed Priority Mode

Figure 17A:
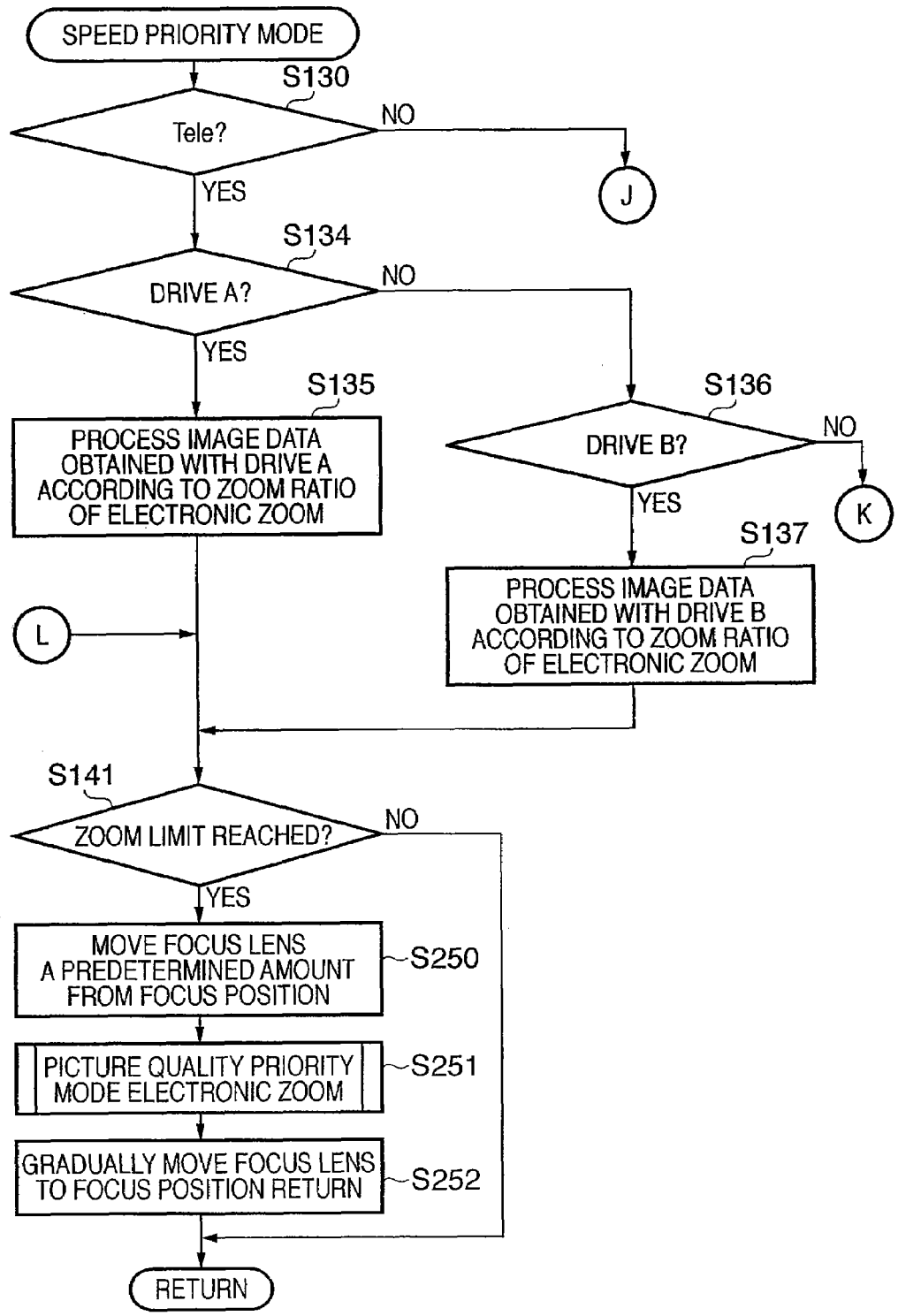
FIG. 17 is a flow chart illustrating the electronic zoom process in the speed priority mode according to the second embodiment of the present invention.

FIG. 17 is a flow chart illustrating the electronic zoom process when either the zooming speed determined by the degree of operation of the T/W switch 22 is fast or the operating mode of the electronic zoom as set by the user is not the image quality priority mode. This process is performed in step S102 shown in FIG. 8 and FIG. 9 described in the first embodiment. It should be noted that the processes of steps S130 to S141 shown in FIG. 17 are the same as those of steps S130 to S141 shown in FIG. 11, and therefore the same reference numerals are used and descriptions thereof are omitted.

In step S141, if the zoom ratio has reached its maximum (maximum telephoto) or its minimum (widest angle of view), the focus lens 12 is displaced a predetermined amount from the in-focus position (step S250). Thereafter, after setting to electronic zoom by an appropriate drive by the image quality priority mode electronic zoom process described using FIG. 16 (step S251), the focus lens 12 is gradually returned to the in-focus position (step S252), and processing then returns to the beginning.

Thus, as described above, according to the second embodiment of the present invention, by varying the aperture coefficient depending on the zoom ratio of the electronic zoom in the image quality priority mode, deterioration in the perceived resolution due to signal processing can be corrected. Further, in the second embodiment, when the perceived resolution increases abruptly due to the switching of the electronic zoom drive method in the speed priority mode described in the first embodiment, the focus is gradually returned after being temporarily de-focused, which makes it possible to produce an operation that is close to the focus tracking of an optical zoom and thus lessen the feeling of incongruity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-159139, filed on Jun. 7, 2006, which is hereby incorporated by reference herein in its entirety.

What is claimed is:

1. An image sensing apparatus having an electronic zoom function, the image sensing apparatus comprising:
    an image sensing element configured to sense an object and outputs image data;
    a mode setting unit configured to set either a first processing mode or a second processing mode;
    a zoom designation unit configured to designate an angle of view;
    a first zoom changing unit configured to change the angle of view by driving said image sensing element by switching a reading region and a reading method of image data from said image sensing element based on either the first processing mode or the second processing mode set by said mode setting unit and an angle of view designated by said zoom designation unit; and
    a second zoom changing unit configured to process image data output from said image sensing element to the angle of view designated by said zoom designation unit,
    wherein said image sensing apparatus performs zooming using said first zoom changing unit and said second zoom changing unit in said first processing mode, and performs zooming using said second zoom changing unit without switching the reading region and reading method of image data and, upon completion of changing to the angle of view designated by said zoom designation unit when changing an angle of view in the wide-angle direction, controls said first and second zoom changing units to attain the designated angle of view in said second processing mode.

2. The image sensing apparatus according to claim 1, wherein, in said second processing mode, when changing an angle of view in a wide-angle direction, prior to start of zoom changing by said second zoom changing unit, said image sensing apparatus sets an entire region of said image sensing element as the reading region.

3. A control method for an image sensing apparatus having an image sensing element configured to sense an object and outputs image data and an electronic zoom function, the control method comprising:
    a mode setting step of setting either a first processing mode or a second processing mode;
    a zoom designation step of designating an angle of view;
    a first zoom changing step of driving said image sensing element by switching a reading region and a reading method of image data from said image sensing element based on the angle of view designated in said zoom designation step and reading the image data, and processing such read image data to attain the angle of view designated in said zoom designation step when said first processing mode is set in said mode setting step;
    a second zoom changing step of, without changing the reading region and reading method of image data, processing image data output from said image sensing element to attain the angle of view designated in said zoom designation step when said second processing mode is set in said mode setting step; and a third zoom changing step of, upon completion of changing to the angle of view designated by said zoom designation step in said second zoom changing step, driving said image sensing element by switching the reading region and the reading method of image data from said image sensing element and reading the image data, and processing the read image data to attain the angle of view designated in said zoom designation step.

* * * * *